United States Patent
Guymon et al.

(10) Patent No.: US 10,358,296 B2
(45) Date of Patent: Jul. 23, 2019

(54) SYSTEMS AND METHODS FOR DELIVERING ASPHALT CONCRETE

(71) Applicants: Michael P. Guymon, Ogden, UT (US); Robert H. Van Arsdale, Bountiful, UT (US)

(72) Inventors: Michael P. Guymon, Ogden, UT (US); Robert H. Van Arsdale, Bountiful, UT (US)

(73) Assignee: Maxwell Properties, LLC, Salt Lake City, UT (US)

(*) Notice: Subject to any disclaimer, the term of this patent is extended or adjusted under 35 U.S.C. 154(b) by 0 days.

(21) Appl. No.: 15/269,877

(22) Filed: Sep. 19, 2016

(65) Prior Publication Data
US 2017/0081809 A1 Mar. 23, 2017

Related U.S. Application Data

(60) Provisional application No. 62/220,853, filed on Sep. 18, 2015.

(51) Int. Cl.
*B65G 33/14* (2006.01)
*E01C 19/46* (2006.01)
(Continued)

(52) U.S. Cl.
CPC ............ *B65G 33/14* (2013.01); *B01F 7/041* (2013.01); *E01C 19/08* (2013.01); *E01C 19/46* (2013.01);
(Continued)

(58) Field of Classification Search
CPC .......... B65G 33/14; B01F 7/041; B01F 7/087; B01F 2215/0063; E01C 19/08; E01C 19/46; E01C 23/06
(Continued)

(56) References Cited

U.S. PATENT DOCUMENTS

| | | | |
|---|---|---|---|
| 2,352,865 A | 7/1944 | Smith | |
| 2,710,744 A * | 6/1955 | Hensler | E01C 19/1045 366/24 |

(Continued)

FOREIGN PATENT DOCUMENTS

| | | |
|---|---|---|
| EP | 0026430 A1 | 9/1980 |
| EP | 0270698 A1 | 12/1986 |

(Continued)

OTHER PUBLICATIONS

Ahmedzade et al., "Evaluation of Steel Slag Coarse Aggregate in Hot Mix Asphalt Concrete", Journal of Hazardous Material 165, 2009, pp. 300-305.

(Continued)

*Primary Examiner* — Abbas Rashid
(74) *Attorney, Agent, or Firm* — David B. Tingey; Bryant J. Keller; Kirton McConkie

(57) ABSTRACT

The present invention relates to systems and methods for mixing various components of asphalt concrete in a mixer and then dispensing the asphalt concrete from the mixer. While the mixer can include any suitable component, in some instances, it includes a heated container, a mixing mechanism that is configured to mix asphalt and an aggregate to form the asphalt concrete within the heated container, and an auger that is configured to force the asphalt concrete out from the heated container. In some cases, a portion of the auger is disposed in a heated cover. In some cases, the cover further comprises a gate that is configured to open (and close) to allow the asphalt concrete to flow from (and be retained in) the heated container. Other implementations are also described.

14 Claims, 19 Drawing Sheets

(51) Int. Cl.
*B01F 7/04* (2006.01)
*E01C 19/08* (2006.01)
*E01C 23/06* (2006.01)

(52) U.S. Cl.
CPC ...... *E01C 23/06* (2013.01); *B01F 2215/0063* (2013.01); *Y02A 30/333* (2018.01)

(58) Field of Classification Search
USPC ........................................................ 366/186
See application file for complete search history.

(56) References Cited

U.S. PATENT DOCUMENTS

| | | | |
|---|---|---|---|
| 2,862,616 A | 7/1958 | Capozzi et al. | |
| 3,245,515 A * | 4/1966 | Rambo | A01K 5/0258 |
| | | | 119/57.2 |
| 3,532,233 A * | 10/1970 | Skelton | A01F 25/16 |
| | | | 198/671 |
| 3,640,759 A | 2/1972 | Primus et al. | |
| 4,092,282 A | 5/1978 | Callan | |
| 4,139,309 A * | 2/1979 | Billingsley | B01F 7/088 |
| | | | 264/37.28 |
| 4,190,156 A | 2/1980 | Adam | |
| 4,310,446 A | 1/1982 | Gaus et al. | |
| 4,334,615 A | 6/1982 | Butler et al. | |
| 4,339,202 A * | 7/1982 | Hart | E01C 19/1013 |
| | | | 366/15 |
| 4,443,578 A | 4/1984 | Frier | |
| 4,518,262 A * | 5/1985 | Bornemann | B01F 7/162 |
| | | | 366/144 |
| 4,706,893 A | 11/1987 | Brock | |
| 4,818,367 A | 4/1989 | Winkler | |
| 4,938,605 A * | 7/1990 | Friedrich | B29B 7/7476 |
| | | | 366/149 |
| 4,971,218 A | 11/1990 | Buchner et al. | |
| 4,975,013 A * | 12/1990 | Lepley | B01F 7/00066 |
| | | | 414/324 |
| 4,978,825 A | 12/1990 | Schmidt et al. | |
| 5,110,641 A | 5/1992 | Kean | |
| 5,160,686 A | 11/1992 | Thaler et al. | |
| 5,223,032 A | 6/1993 | Gaudio et al. | |
| 5,257,491 A | 11/1993 | Rouyer et al. | |
| 5,278,207 A | 1/1994 | Kluttz | |
| 5,322,867 A | 6/1994 | Kluttz | |
| 5,339,975 A | 8/1994 | Stoner | |
| 5,345,041 A * | 9/1994 | Swanson | G01G 13/026 |
| | | | 177/105 |
| 5,392,592 A | 2/1995 | Bozich et al. | |
| 5,397,530 A | 3/1995 | Narasimhan et al. | |
| 5,437,318 A * | 8/1995 | Kanzler | B65B 39/002 |
| | | | 141/247 |
| 5,451,619 A | 9/1995 | Kluttz et al. | |
| 5,452,800 A | 9/1995 | Muir | |
| 5,494,510 A | 2/1996 | Kuc, Sr. | |
| H1580 H | 8/1996 | Kluttz | |
| 5,543,211 A | 8/1996 | Gallagher et al. | |
| 5,547,276 A * | 8/1996 | Sulzbach | B01F 15/0412 |
| | | | 366/139 |
| 5,576,363 A | 11/1996 | Gallagher et al. | |
| 5,624,594 A | 4/1997 | Matsen et al. | |
| 5,712,033 A | 1/1998 | Gallagher et al. | |
| 5,718,752 A | 2/1998 | Kluttz | |
| 5,723,844 A | 3/1998 | Dow et al. | |
| 5,733,616 A | 3/1998 | Janicki et al. | |
| 5,765,686 A | 6/1998 | Wright et al. | |
| 5,800,116 A * | 9/1998 | Smith | B60P 1/42 |
| | | | 198/550.1 |
| RE36,177 E | 4/1999 | Rouyer et al. | |
| 5,897,951 A | 4/1999 | Gallagher et al. | |
| 5,911,817 A | 6/1999 | Hayner | |
| 5,921,675 A * | 7/1999 | Zikeli | B01F 15/0288 |
| | | | 366/186 |
| 5,989,662 A | 11/1999 | Janicki et al. | |
| 5,992,628 A | 11/1999 | Vermilion et al. | |
| 6,067,776 A | 5/2000 | Heuer et al. | |
| 6,102,613 A | 8/2000 | Medico, Jr. et al. | |
| 6,107,373 A | 8/2000 | Janicki et al. | |
| 6,115,029 A | 9/2000 | Jaaskelainen, Jr. et al. | |
| 6,139,612 A | 10/2000 | Kitagawa et al. | |
| 6,206,607 B1 | 3/2001 | Medico, Jr. et al. | |
| 6,230,890 B1 | 5/2001 | Waver et al. | |
| 6,362,257 B1 | 3/2002 | Chehovits et al. | |
| 6,405,921 B1 | 6/2002 | Cochrane | |
| 6,588,928 B2 * | 7/2003 | Huber | A22C 5/00 |
| | | | 366/156.2 |
| 6,722,489 B1 * | 4/2004 | Cook | B65G 33/32 |
| | | | 198/601 |
| 6,766,941 B1 | 7/2004 | Tokarski | |
| 6,966,723 B2 | 11/2005 | Zentner | |
| 7,350,670 B2 | 4/2008 | Steeves et al. | |
| 7,410,062 B2 | 8/2008 | Monk | |
| 7,994,244 B2 | 8/2011 | Binkley | |
| 8,017,681 B2 | 9/2011 | Guymon et al. | |
| 8,162,059 B2 | 4/2012 | Nguyen et al. | |
| 8,283,409 B2 | 10/2012 | Guymon et al. | |
| 8,459,538 B2 | 6/2013 | Raeth et al. | |
| 8,952,089 B2 | 2/2015 | Guymon et al. | |
| 2001/0020058 A1 | 9/2001 | Kamaishi et al. | |
| 2003/0032707 A1 | 2/2003 | Hemmings et al. | |
| 2003/0091389 A1 | 5/2003 | Zentner | |
| 2003/0155261 A1 | 8/2003 | Paul et al. | |
| 2003/0190438 A1 | 10/2003 | Suzuki et al. | |
| 2004/0136261 A1 * | 7/2004 | Huber | B01F 7/042 |
| | | | 366/152.1 |
| 2006/0058461 A1 | 3/2006 | Krulis et al. | |
| 2006/0292356 A1 | 12/2006 | Minagoshi | |
| 2007/0027235 A1 | 2/2007 | Marchal | |
| 2007/0231545 A1 | 10/2007 | Ruan | |
| 2008/0118689 A1 | 5/2008 | Mehta et al. | |
| 2008/0190326 A1 | 8/2008 | Fields | |
| 2009/0084287 A1 | 4/2009 | Partanen et al. | |
| 2010/0210745 A1 | 8/2010 | McDaniel et al. | |
| 2011/0121222 A1 | 5/2011 | Guymon et al. | |
| 2011/0139909 A1 * | 6/2011 | Kawamoto | B01F 7/087 |
| | | | 241/23 |
| 2011/0168058 A1 | 7/2011 | Forth | |
| 2011/0272858 A1 | 11/2011 | Tamir | |
| 2011/0294927 A1 | 12/2011 | Williams et al. | |
| 2013/0075298 A1 | 3/2013 | Chehovits et al. | |
| 2013/0104774 A1 | 5/2013 | Teeter, Jr. et al. | |
| 2013/0199410 A1 | 8/2013 | Maldonado et al. | |
| 2013/0273272 A1 | 10/2013 | Guymon et al. | |
| 2014/0263283 A1 | 9/2014 | Maxwell et al. | |
| 2015/0018460 A1 | 1/2015 | Guymon et al. | |
| 2015/0191283 A1 | 7/2015 | Guymon et al. | |

FOREIGN PATENT DOCUMENTS

| | | |
|---|---|---|
| EP | 0270698 B1 | 12/1986 |
| EP | 0637548 A1 | 8/1993 |
| EP | 2383193 B1 | 11/2012 |
| WO | WO 1991/18803 A1 | 12/1991 |
| WO | WO 1999/30973 A1 | 6/1999 |
| WO | WO 2000/55280 A1 | 9/2000 |
| WO | WO 2000/76856 A1 | 12/2000 |
| WO | WO 2003/066452 A2 | 8/2003 |
| WO | WO 2004/096917 A1 | 11/2004 |
| WO | WO 2007/124237 A1 | 11/2007 |

OTHER PUBLICATIONS

Tapkin, "Mechanical Evaluation of Asphalt-Aggregate Mixtures Prepared with Fly Ash as a Filler Replacement", Can. J. Civ. Eng 35, 2008, pp. 27-40.

Tore et al., "Mechanical and Morphological Studies of Poly(propylene)-Filled Eggshell Composites", Macromolecular Materials and Engineering 292, 2007, pp. 1027-1034.

* cited by examiner

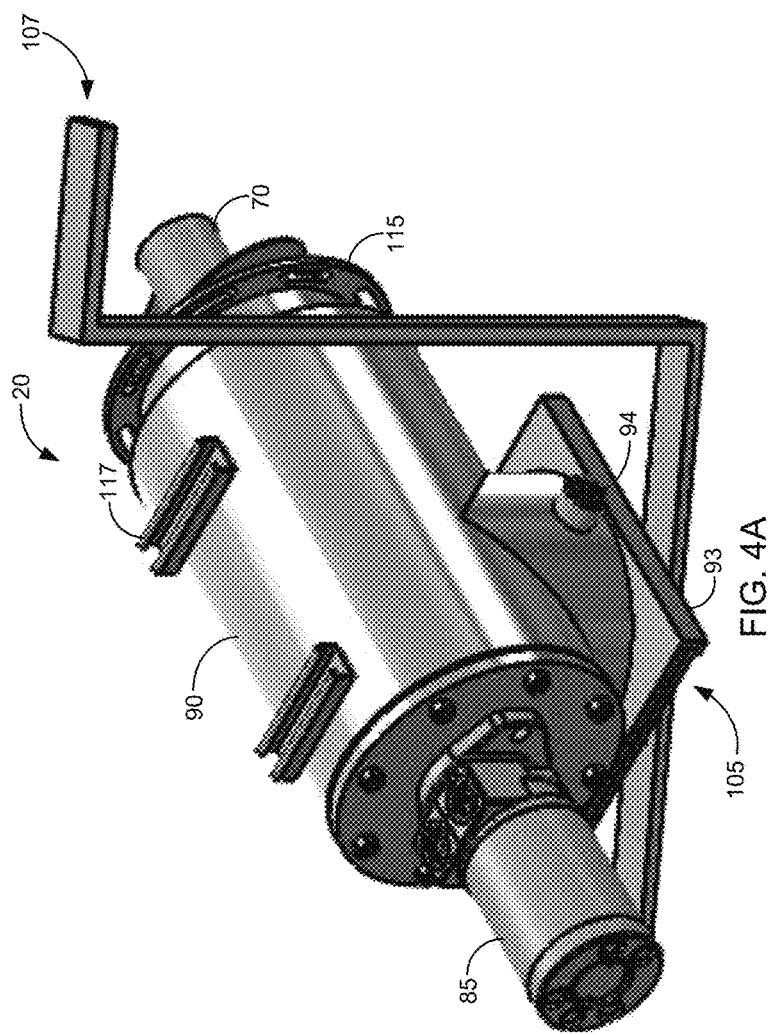

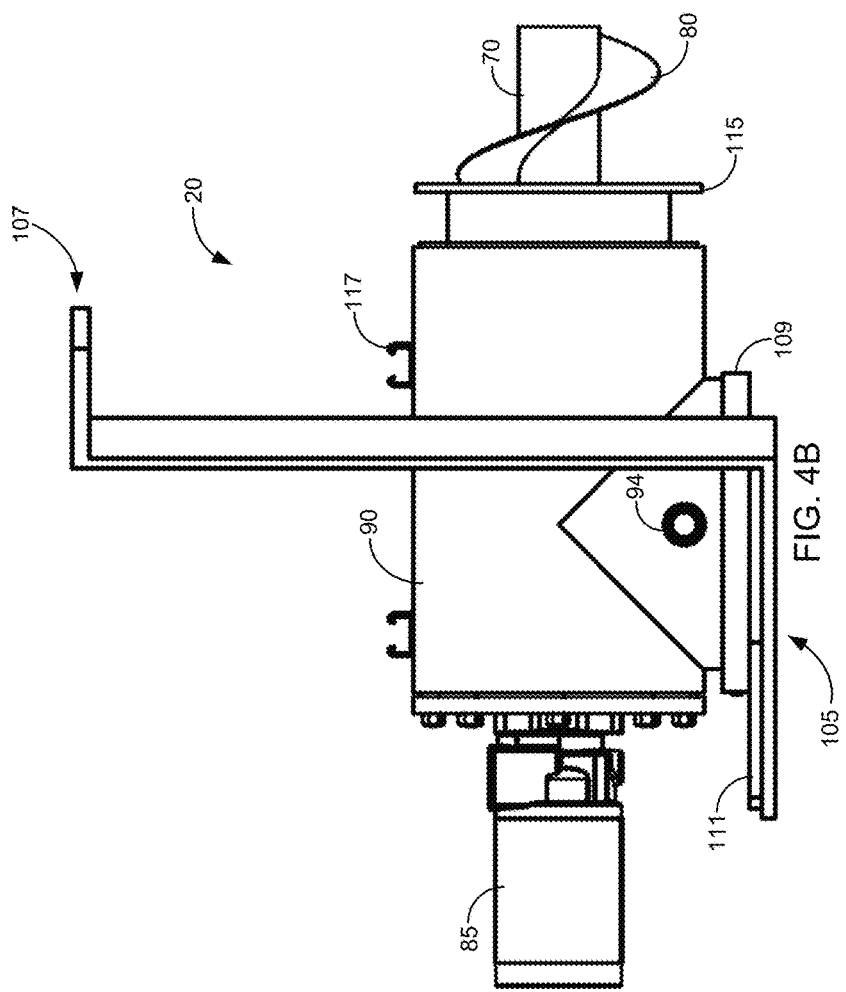

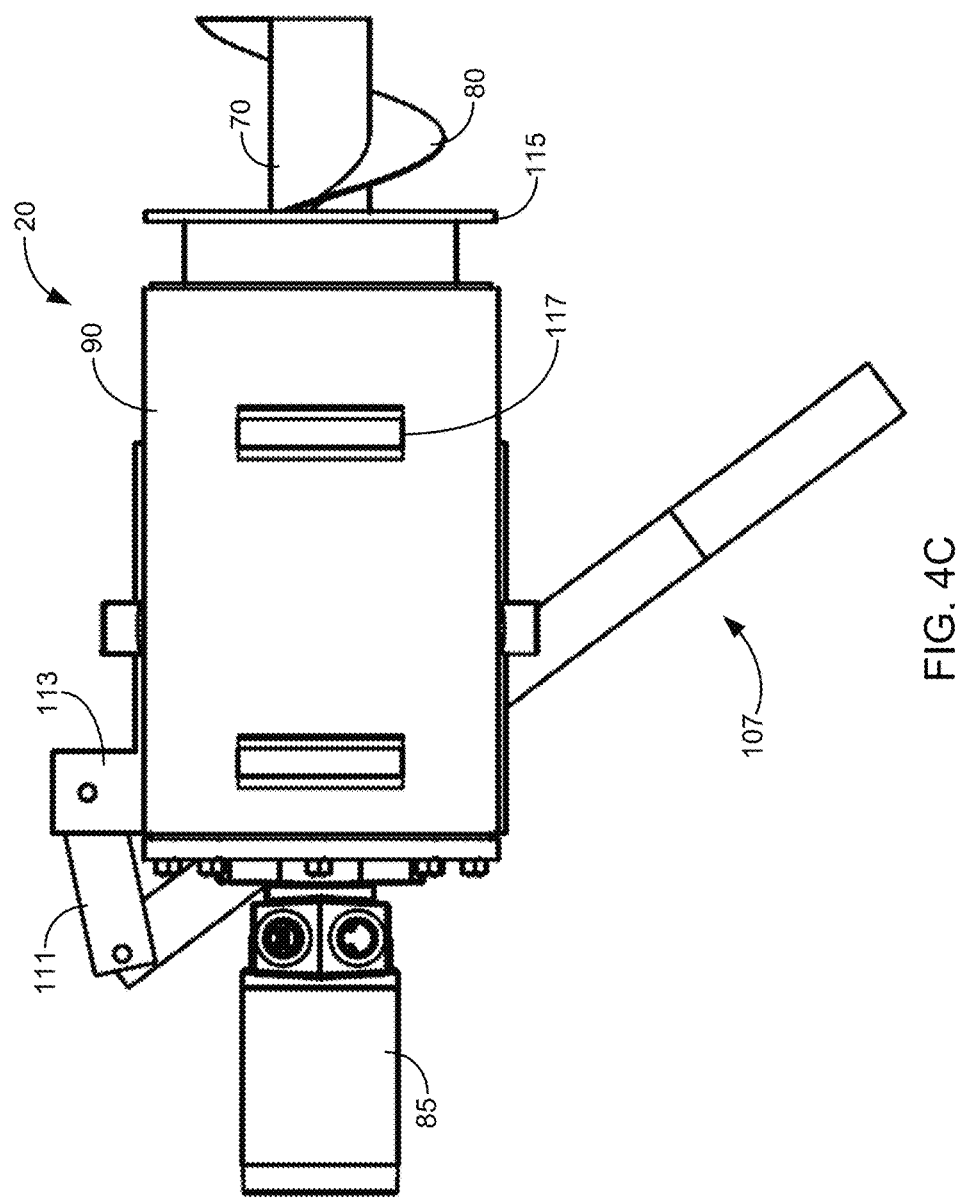

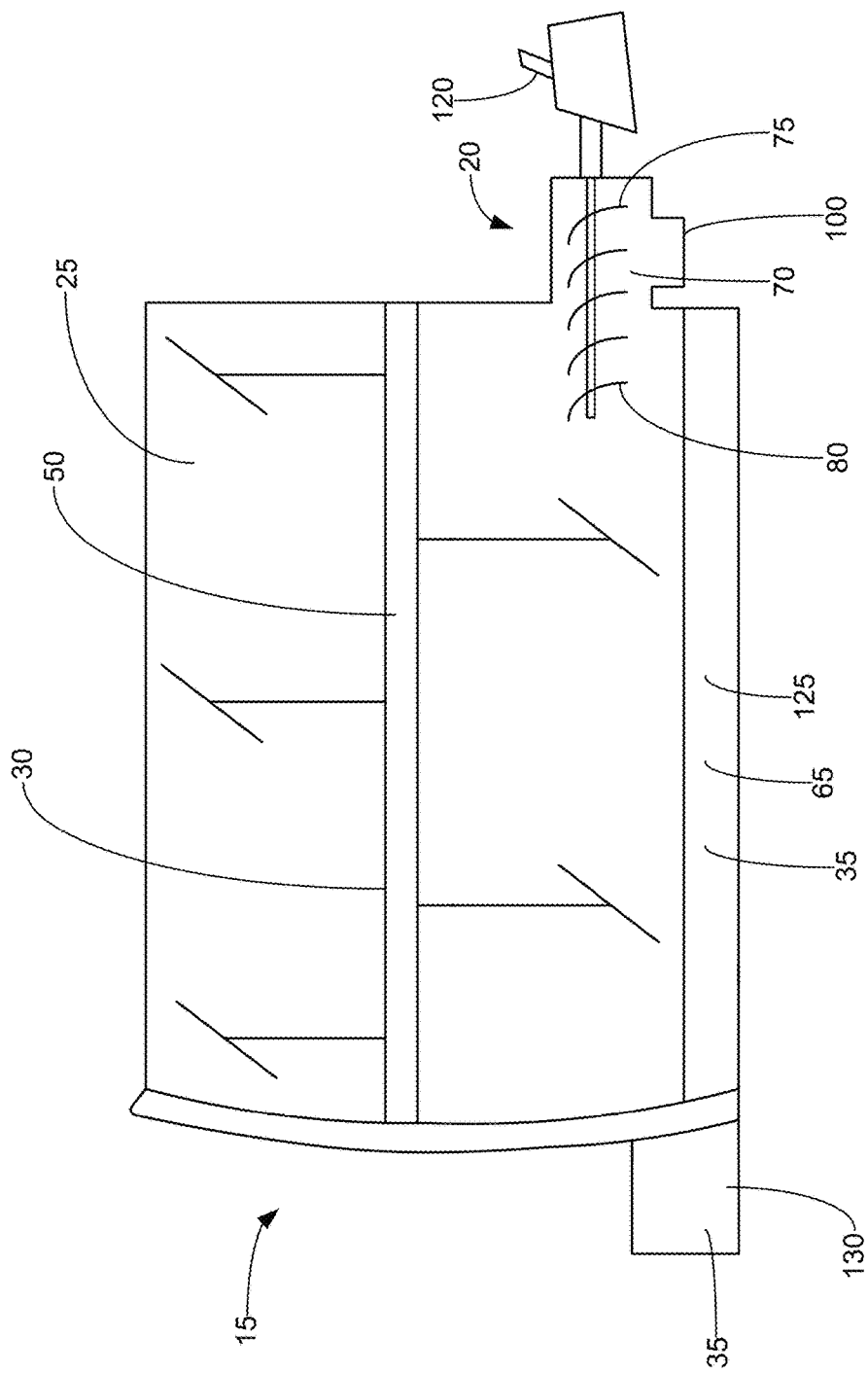

SYSTEMS AND METHODS FOR DELIVERING ASPHALT CONCRETE

RELATED APPLICATIONS

This application claims priority to U.S. Provisional Patent Application Ser. No. 62/220,853, entitled SYSTEMS AND METHODS FOR DELIVERING ASPHALT CONCRETE, which was filed on Sep. 18, 2015 and is incorporated herein in its entirety by reference.

BACKGROUND OF THE INVENTION

1. Field of the Invention

The present invention relates to systems and methods for delivering asphalt concrete. In particular, some implementations of the present invention relate to systems and methods for mixing various components of asphalt concrete in a mixer and then dispensing the asphalt concrete from the mixer. In some such implementations, the described systems and methods comprise an auger that is configured to force asphalt concrete from an asphalt mixer.

2. Background and Related Art

Asphalt, which is also known as bitumen, is a sticky and highly viscous form of petroleum. Although asphalt can be used for a wide variety of purposes, in some cases, it is used as a glue, adhesive, binder, sealant, and/or waterproofing agent. That said, in many locations, the primary use of asphalt is for road construction and repair. In this regard, asphalt is often mixed with aggregate particles (e.g., rock and/or other materials) to form asphalt concrete, which can function as a pavement and/or filler.

While asphalt concrete can be made in any suitable manner, in some embodiments, after (and/or while) being combined together, asphalt and rock particles are heated and mixed until the asphalt melts and the rock particles become coated and bound together by the asphalt. In many instances, once produced, the hot asphalt concrete is often poured or otherwise delivered to a desired location where the asphalt concrete is compacted and allowed to cool to form a pavement, coating, patch, filler, and/or other desired formation.

Although hot asphalt concrete can be delivered to a desired location in a variety of manners (e.g., via dump truck, wheel barrow, etc.), conventional methods for delivering asphalt concrete are not necessarily without their shortcomings. Indeed, some conventional methods for delivery asphalt cement may: take a relatively long period of time to deliver a desired amount of asphalt concrete to a desired location, allow the asphalt concrete to cool unduly early, result in burns to those using the asphalt concrete, and/or otherwise cause or be associated with a variety of undesirable results.

Thus, while techniques currently exist that are used to deliver asphalt concrete to a desired location, challenges still exist, including those mentioned above. Accordingly, it would be an improvement in the art to augment or even replace current techniques with other techniques.

SUMMARY OF THE INVENTION

The present invention relates to systems and methods for delivering asphalt concrete. In particular, the present invention relates to systems and methods for mixing various components of asphalt concrete in a mixer and then dispensing the asphalt concrete from the mixer. In some implementations, the described systems and methods comprise an auger that is configured to force asphalt concrete from an asphalt mixer.

In some implementations, the described systems include an asphalt mixer and/or a delivery mechanism. While the asphalt mixer can comprise any suitable component or characteristic that allows it to heat and/or mix one or more ingredients of asphalt concrete, in some implementations, the mixer comprises a heated container and one or more mixing components (e.g., agitators, paddles, augers, beaters, tines, rollers, shafts, rotors, rotating drums (e.g., that are configured to lift and drop, spin, and/or otherwise mix the components disposed therein), asphalt mixers (e.g., as produced by NORARC or Earlton Canada, or otherwise), vibrators, masticators, and/or any another suitable mixing mechanism or mechanisms). Indeed, in some implementations, the heated container includes one or more agitators that are configured to mix asphalt, aggregate, and/or other ingredients to form the asphalt concrete. Additionally, in some implementations, the heated container is configured to funnel, channel, push, and/or otherwise direct asphalt concrete to an opening of the container.

While the heated container can heat the ingredients disposed in the container in any suitable manner, in some implementations, a heat source (e.g., one or more flames, electric heating elements, burners, inductive heating elements, and/or other suitable heating components are used to heat a heat transfer medium (e.g., one or more oils, metals, portions of the container 25, molten salts, waters, synthetic organic fluids, silicone fluids, glycol-based fluids, and/or any other suitable heat transfer media), which, in turn, is used to heat the various ingredients of the asphalt concrete.

The delivery mechanism can comprise any suitable component that allows it to force asphalt concrete out of the heated container. Some examples of such components include, but are not limited to, one or more augers; augers comprising one or more paddles, tines, blades, projections, and/or other objects configured to push asphalt concrete as the augers are rotated; conveyor belts; counter rotating augers; corkscrews; paddle wheels; gears; peristaltic pumps; paddle chains; conveyor paddle chains; handling fans; corrugated sidewall belts; blades; rotors; off-balanced rotors; intermeshing counter-rotating screws; vibrators (e.g., electromagnetic, pneumatic, hydraulic, and/or other suitable vibrators); slides; chutes; and/or other suitable mechanisms that are configured to force (and/or otherwise direct) asphalt concrete out of the heated container. Indeed, in some cases, the delivery mechanism comprises one or more augers.

In some cases, the delivery mechanism comprises a first delivery mechanism that works in conjunction with a second delivery mechanism. In this regard, the first and second delivery mechanisms can comprise any suitable components, including, without limitation, a first auger that is configured to direct asphalt to a slide, a chute, a second auger, and/or other object that is configured to direct the asphalt to a desired location. Indeed, in some cases, the delivery mechanism comprises a first delivery mechanism (e.g., a first auger) that is configured to feed asphalt cement to a second delivery mechanism (e.g., a second auger). In such cases, the first and second delivery mechanisms (e.g., augers) can be coupled together in any suitable manner. Indeed, in some cases, the first and second delivery mechanisms are rotatably and/or pivotally coupled together such that the second delivery mechanism can pivot in one or more planes with respect to the first delivery mechanism.

Where the delivery mechanism comprises an auger, the auger can have any suitable characteristic that allows it to force asphalt concrete out of the heated chamber. For instance, while the auger can be disposed completely within the heated container, in some implementations, a portion of the auger is disposed within the heated container while another portion of the auger is disposed outside of the container.

Although in some implementations in which a portion of the auger (and/or other delivery mechanism) that is disposed outside of the container (or the external portion) is uncovered or open, in some other implementations, the external portion of the auger is at least partially disposed in a tube, pipe, conduit, channel, and/or other suitable cover having one or more openings through which the asphalt concrete can be forced. While such a cover can have any suitable component or characteristic, in some implementations, the cover is heated (e.g., to keep the asphalt concrete in a desired temperature range). Additionally, in some implementations, the cover comprises one or more valves or gates that are configured to selectively open and close to respectively allow asphalt concrete to flow from, and to allow the asphalt concrete to be retained in, the cover.

Although, in some implementations, the asphalt mixer is manufactured with the auger, in some other implementations, the auger is configured to be retrofitted to an existing asphalt mixer. In this regard, a retrofit auger can be attached to a novel or conventional asphalt mixer in any suitable manner, including, without limitation, via one or more bolts, brackets, flanges, welds, rivets, adhesives, mechanical fasteners, frictional engagements, and/or other suitable methods. Indeed, in some implementations, the auger is configured to be bolted to an existing asphalt mixer such that a portion of the auger extends into the heated container.

While the methods and processes of the present invention may be particularly useful in the area of hot mix asphalt, those skilled in the art can appreciate that the methods and processes can be used in a variety of different applications and in a variety of different areas of manufacture to yield other forms of asphalt and/or mastic materials. Indeed, in some implementations, the described systems and methods are used to deliver warm mix asphalt concrete, cold mix asphalt concrete, cut-back asphalt concrete, mastic asphalt concrete, natural asphalt concrete, polymerized asphalt, and/or any other suitable form of asphalt concrete and/or hot applied mastic. Additionally, while the described systems and methods may be particularly useful for filling potholes, they may be used for any other suitable purpose, including, without limitation, for large crack repair, filling bridge gaps, forming pavement, pavement repair, forming speed bumps, and/or any other suitable purpose.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above-recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIG. 4A illustrates a perspective view of the delivery mechanism, in accordance with a representative embodiment;

FIG. 4B illustrates a side view of the delivery mechanism, in accordance with a representative embodiment;

FIG. 4C illustrates a top view of the delivery mechanism, in accordance with a representative embodiment;

FIG. 5 illustrates a side schematic view of the asphalt mixer comprising the delivery system, in accordance with a representative embodiment.

DETAILED DESCRIPTION OF THE INVENTION

The present invention relates to systems and methods for delivering asphalt concrete. In particular, the present invention relates to systems and methods for mixing various components of asphalt concrete in a mixer and then dispensing the asphalt concrete from the mixer. In some embodiments, the described systems and methods comprise an auger that is configured to force asphalt concrete from an asphalt mixer.

As used in herein, the term asphalt concrete, and variations thereof, may refer to any suitable material comprising asphalt and/or bitumen that can be heated in, mixed in, and/or delivered by the described systems and methods. Some examples of asphalt concrete comprise a mixture of one or more binders (e.g., asphalt) and one or more aggregates (e.g., rock, gravel, particulate matter, etc.) and/or any other suitable known or novel type of asphalt concrete, polymerizing asphalt, mastic, and/or hot applied mastic.

As used herein, the terms deliver, delivering, and variations thereof may refer to a process of moving a material (e.g., asphalt concrete) from within a container (e.g., an asphalt mixer) to a desired location (e.g., a wheelbarrow, the ground, a shovel, a trailer, a crack, a hole, a bed of a truck, a hole, and/or any other suitable location).

Figure 1:
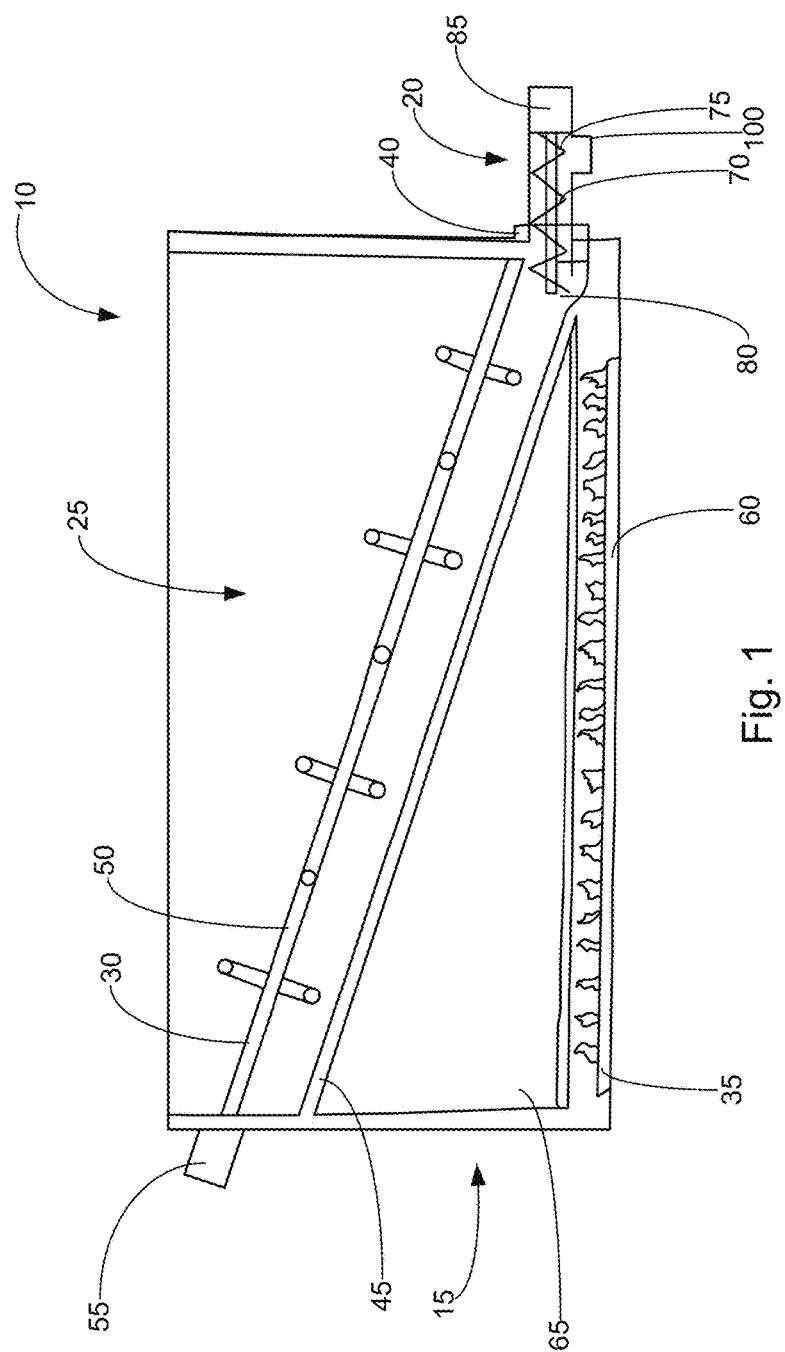
FIG. 1 illustrates a side, cross-sectional view of an asphalt mixer comprising a delivery mechanism, in accordance with a representative embodiment.

The described systems can comprise any suitable component that allows the systems to deliver asphalt concrete (including, without limitation, asphalt concrete having a relatively high viscosity) from a container to a desired location (e.g., a wheelbarrow, bucket, the ground, a shovel, a truck bed, a trailer, a paving machine, and/or any other suitable location). By way of non-limiting illustration, FIG. 1 illustrates an embodiment in which the described asphalt delivery system 10 comprises an asphalt mixer 15 and a delivery mechanism 20.

With respect to the asphalt mixer 15, the mixer can comprise any suitable component that allows it to heat and/or mix asphalt, aggregate, and/or any other suitable components to form asphalt concrete. FIG. 1 shows that, in some embodiments, the asphalt mixer 15 comprises one or more containers 25 (e.g., heated containers or otherwise), mixing components 30, heaters 35, and/or asphalt delivery channels (or openings) 40.

With respect to the container 25, the container can comprise any suitable component or characteristic that allows it to hold and/or heat various ingredients to form an asphalt concrete. In this regard, the container can comprise any suitable material, including, without limitation, one or more types of metal (e.g., steel, iron, copper, an alloy, and/or any other suitable metal), ceramics, cements, synthetic materials, and/or other suitable materials. Indeed, in some embodiments, the container comprises steel.

The container 25 can further be any suitable size that allows it to function as intended. By way of non-limiting example, the container (hence the asphalt mixer 15) can be sized to fit: on a hand truck, on a hand-pulled wagon/cart, on a trailer, in the bed of a pick-up truck, on a semi-rig trailer, on a dump truck, on a skid, on a scaffolding, on a tower, on a crane, and/or in any other suitable location. In some embodiments, however, the mixer and the container are disposed on (or otherwise comprise) a trailer (not shown).

The container 25 can be any suitable shape that allows it to function as intended. Indeed, in some embodiments, an internal compartment of the container is cuboidal, pyramidal, triangular, polygonal, cylindrical, conical, irregular, symmetrical, asymmetrical, and/or any other suitable shape. Additionally, while the internal compartment of the container need not be shaped to help direct asphalt concrete (or other materials) to the asphalt delivery channel 40, in some embodiments, the internal compartment is shaped to perform such a function. Although in such latter embodiments, the container can be shaped in any suitable manner that allows it to direct asphalt to the asphalt delivery channel, FIG. 1 shows an embodiment in which the container 25 comprises one or more sloped surfaces 45 that are configured to channel asphalt concrete to the asphalt delivery channel 40.

The mixer 15 can further comprise any suitable mixing component that is configured to mix various ingredients to form asphalt concrete. Some non-limiting examples of such mixing components include one or more agitators, paddles, augers, blades, hooks, scrapers, beaters, kneader, tines, rollers, shafts, rotors, counter rotating screws, rotating drums (e.g., that are configured to lift and drop, rotate, and/or otherwise mix the components disposed therein), and/or other suitable mixing mechanisms. In this regard, FIG. 1 shows an embodiment in which the mixing component 30 comprises one or more agitators 50 that are configured to be turned by one or more motors 55 to mix ingredients within the mixer 15.

With respect to the heater 35, the heater can comprise any suitable heat source that is capable of heating asphalt concrete (and/or components thereof) in the container 25 to a temperature that allows the concrete in the mixer 15 to be soft enough to be delivered from the mixer (e.g., via the asphalt delivery channel 40). Some examples of suitable heat sources include, but are not limited to, one or more burners, heating coils, heating elements, electric heaters, inductive heaters, ovens, fires, torches, solar heaters, and/or other suitable heat sources that are capable of softening asphalt.

The heater 35 may also use any suitable energy source to heat the asphalt concrete to a desired temperature. Some non-limiting examples of such energy sources include one or more fossil fuels, types of coal, sources of electricity, types of wood, types of biomass, types of biofuels, solar energy mechanisms, geothermal sources, and/or any other suitable sources. Additionally, while the heater can heat the asphalt concrete in any suitable manner (i.e., directly and/or indirectly), in some embodiments, the heater heats a heat transfer medium (e.g., one or more oils, metals, portions of the container 25, molten salts, types of water, synthetic organic fluids, silicone fluids, glycol-based fluids, and/or any other suitable heat transfer medium), which, in turn, is used to heat the various ingredients of the asphalt concrete. By way of non-limiting illustration, FIG. 1 shows an embodiment in which the heater 35 comprises a burner 60 that is configured to heat a heat transfer medium 65 (e.g., an oil), which (in turn) heats the materials (not shown) within the container 25.

Figure 2A:
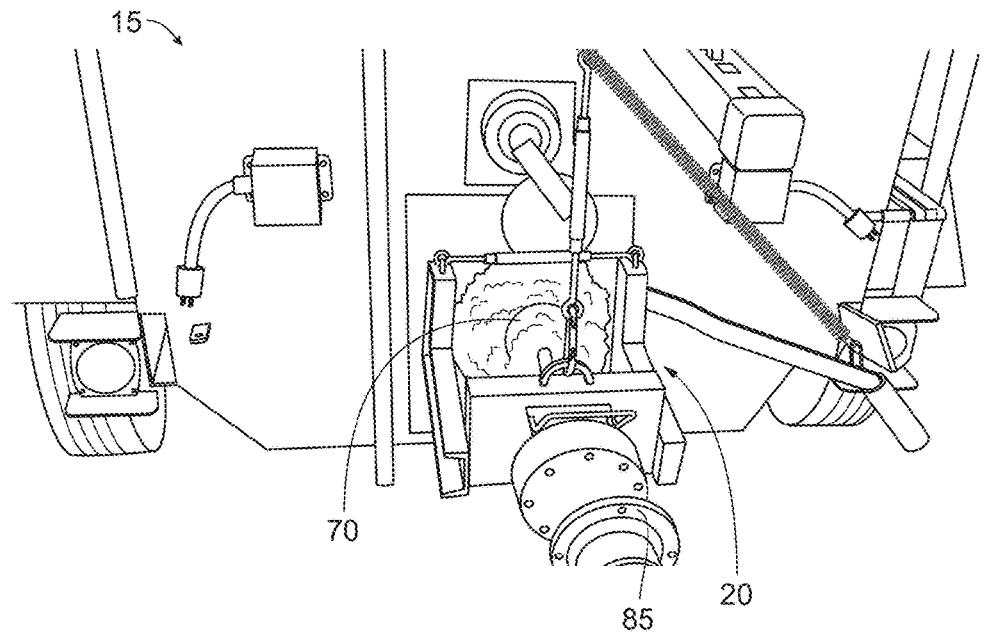
FIGS. 2A-2C each illustrate a perspective view of a portion of the asphalt mixer comprising the delivery mechanism, in accordance with a representative embodiment.
Figure 2B:
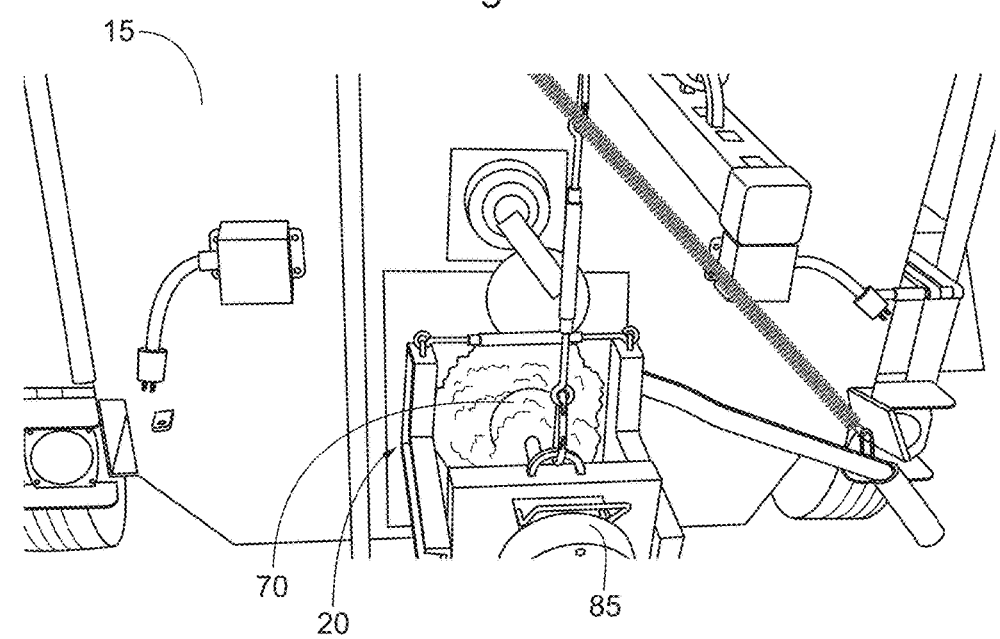
Figure 2C:
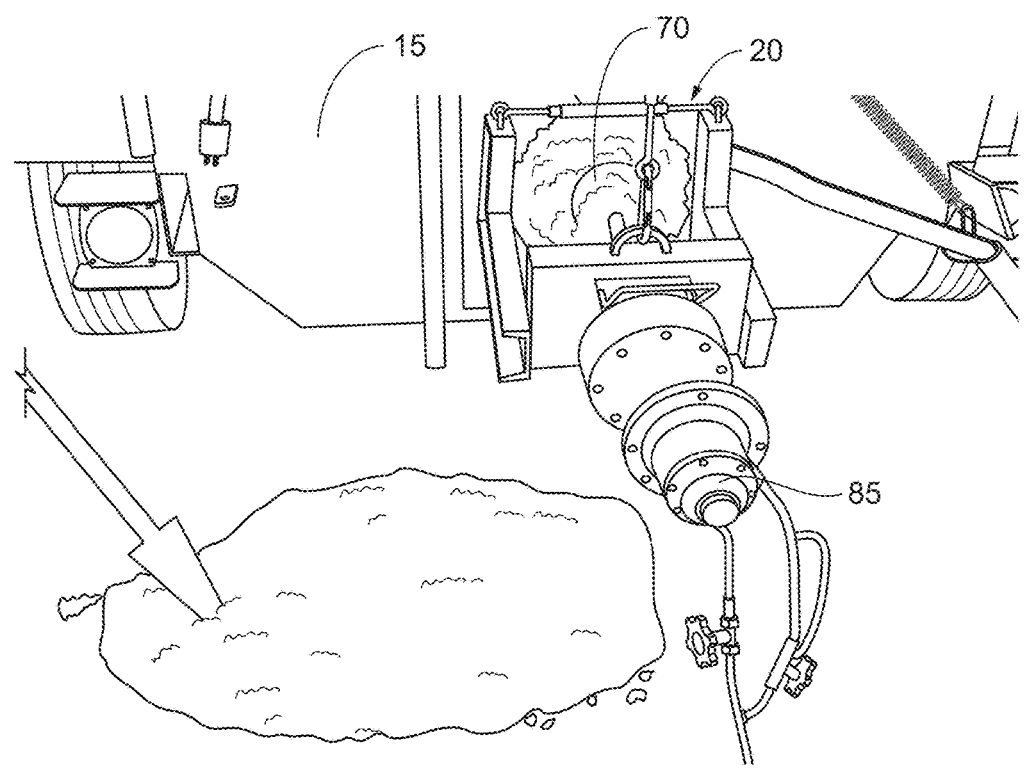

With reference now to the delivery mechanism 20, the delivery mechanism can comprise any suitable mechanism that is capable of forcing and/or otherwise directing asphalt concrete out of the container 25. Some non-limiting examples of suitable delivery mechanisms include one or more augers, conveyor belts, paddle wheels, gears, peristaltic pumps, paddle chains, conveyor paddle chains, handling fans, blades, rotors, off-balanced rotors, intermeshing counter-rotating screws, vibrators (e.g., electromagnetic, pneumatic, hydraulic, and/or other suitable vibrators), slides, chutes, pipes, conduits, shakers, and/or other suitable mechanisms that are configured to force asphalt concrete out of the container. In this regard, FIGS. 1-2C show some embodiments in which the delivery mechanism 20 comprises one or more augers 70.

Where the delivery mechanism 20 comprises one or more augers 70, the augers can be disposed in any suitable location that allows them to remove asphalt concrete from the container 25. Indeed, in some embodiments, one or more augers are disposed entirely within the container. In other embodiments, however, one or more augers are disposed entirely outside of the container. In accordance with still other embodiments, FIGS. 1 and 3A-3C show that a first portion 75 of the auger 70 is configured to be disposed outside of the container 25, while a second portion 80 of the auger 70 is configured to be disposed within the container 25.

Although the auger 70 can comprise any suitable characteristic, in some embodiments, it is optionally configured to have a stop position in which it at least partially impedes asphalt concrete from exiting the container 25 through the asphalt delivery channel 40. In this regard, the auger can prevent asphalt concrete from flowing from the asphalt delivery channel in any suitable manner, including, without limitation, by at least partially blocking the opening 40 (or deliver channel), by trapping asphalt cement in contact with a portion of the auger, and/or in any other suitable manner.

The auger 70 can be powered in any suitable manner that allows it to function as intended. In some embodiments, however, the auger is powered by one or more hydraulic drives (e.g., a low-geared, variable-speed drive, a 4-way variable speed control valve, a metering system, and/or any other suitable mechanism), pneumatic drives (e.g., a low-geared, variable-speed, reversible 4-way 3-way position valve, and/or any other suitable mechanism), hand-powered mechanisms (e.g., a crank and/or other suitable mechanism), direct drives from an engine, power take off units, motors, servos, actuators, hydrostatic drives, electromechanical drives, and/or other suitable mechanisms and/or in any other suitable manner. By way of non-limiting illustration, FIGS. 1-3C show some embodiments in which the auger 70 is powered by a motor 85 (e.g., a hydraulic drive).

In addition to the aforementioned components, the auger 70 can further comprise any other suitable component, including, without limitation, one or more packing glands, seals, bearings, shafts, end flanges (e.g., 114, 115), mounting plates, mounts, axels, heaters configured to heat the auger, and/or other suitable components. Indeed, in some embodiments, the auger comprises one or more packing glands, seals, and/or bearings between the auger and the motor 85.

Although, in some embodiments, the first portion 75 of the auger 70 is substantially uncovered or open, in some other embodiments, at least part of the first portion of the auger is disposed in a tube, sleeve, pipe, and/or other suitable covering structure (collectively and individually referred to as the cover). While the cover (some embodiments of which are illustrated as cover 90 in FIGS. 3A-3C) can perform any suitable function, in some embodiments, the cover: protects users from the auger, directs the asphalt concrete to a desired location, heats asphalt concrete that is in contact with the auger, protects asphalt concrete from environmental elements while the concrete is in contact with the auger, and/or performs a variety of other suitable functions.

Figure 3A:
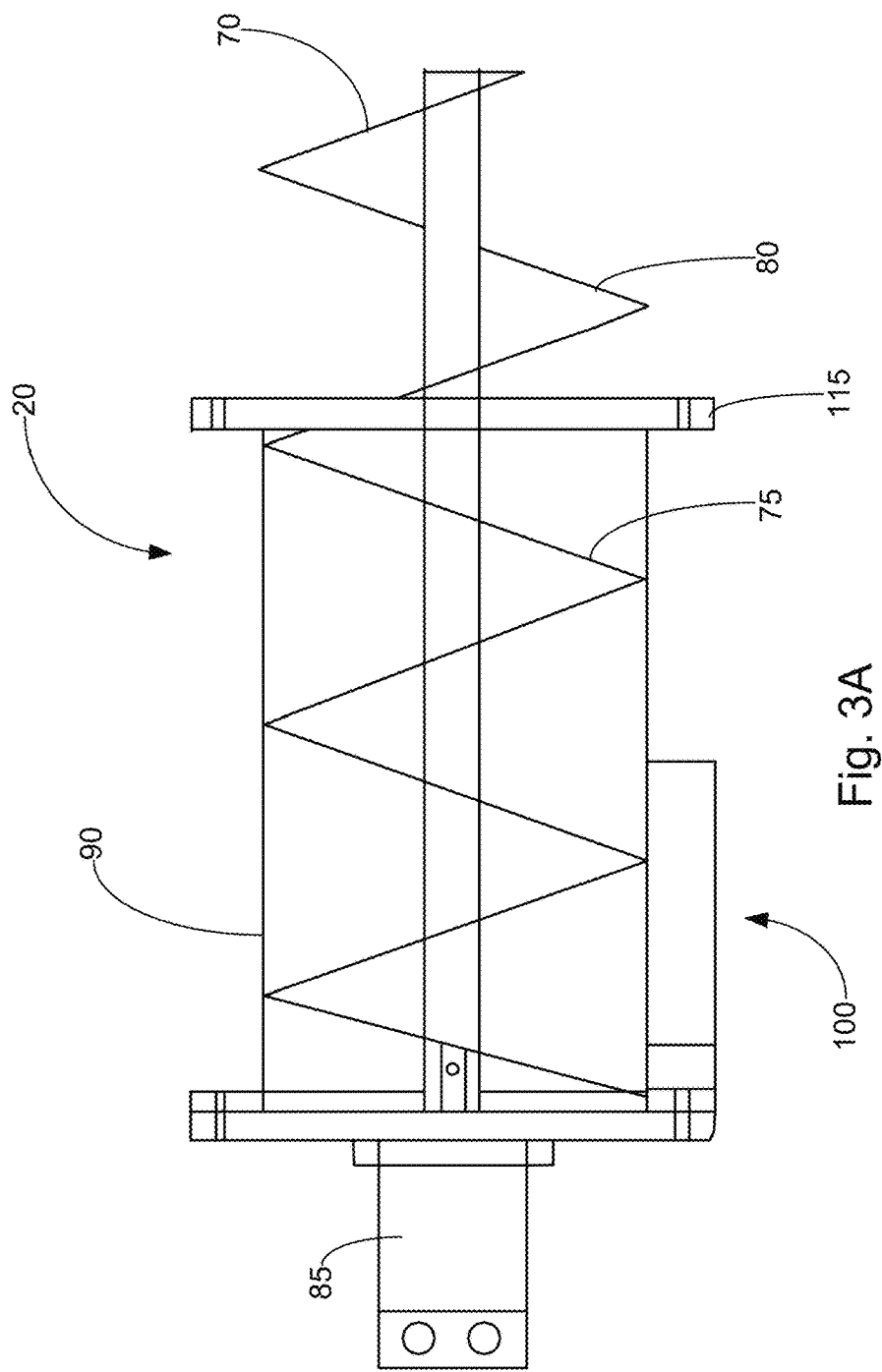
FIGS. 3A-3C each illustrate a side schematic view of the delivery mechanism, in accordance with some representative embodiments.
Figure 3B:
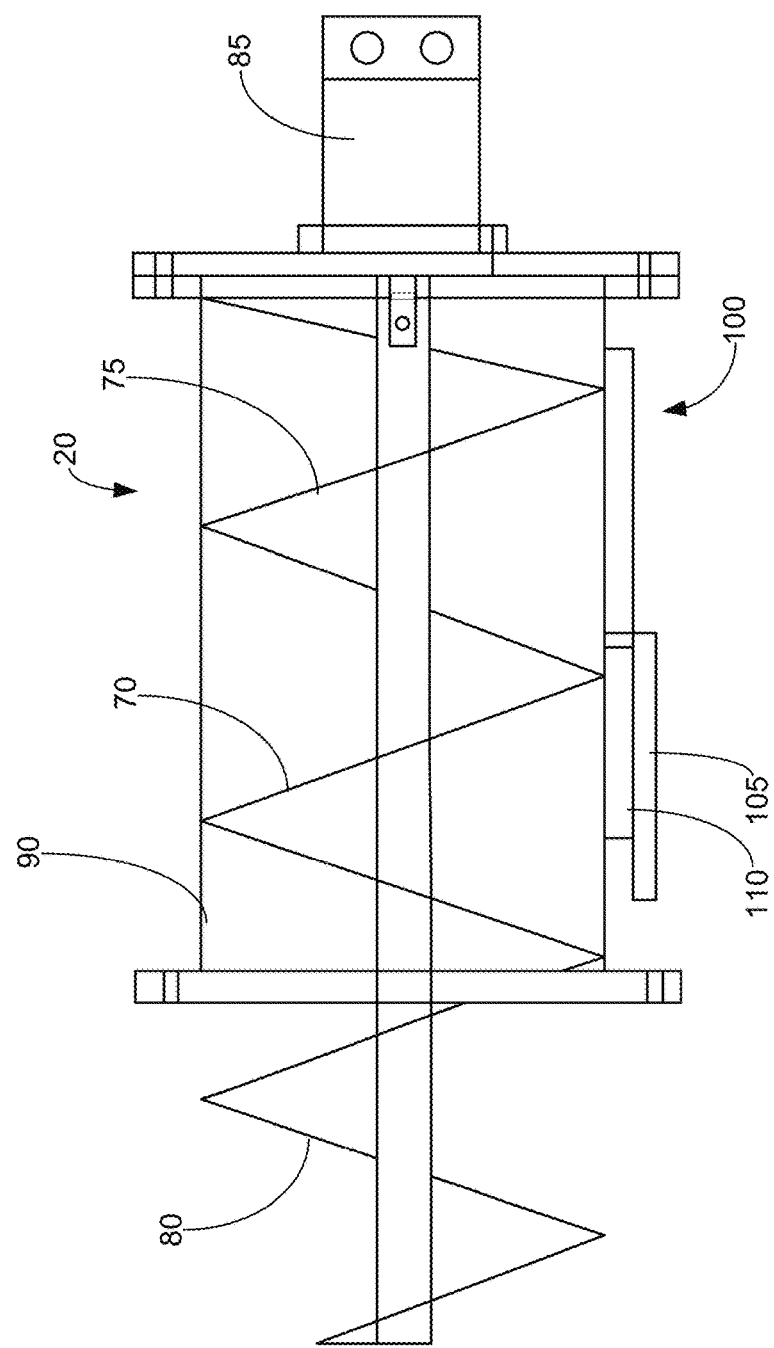
Figure 3C:
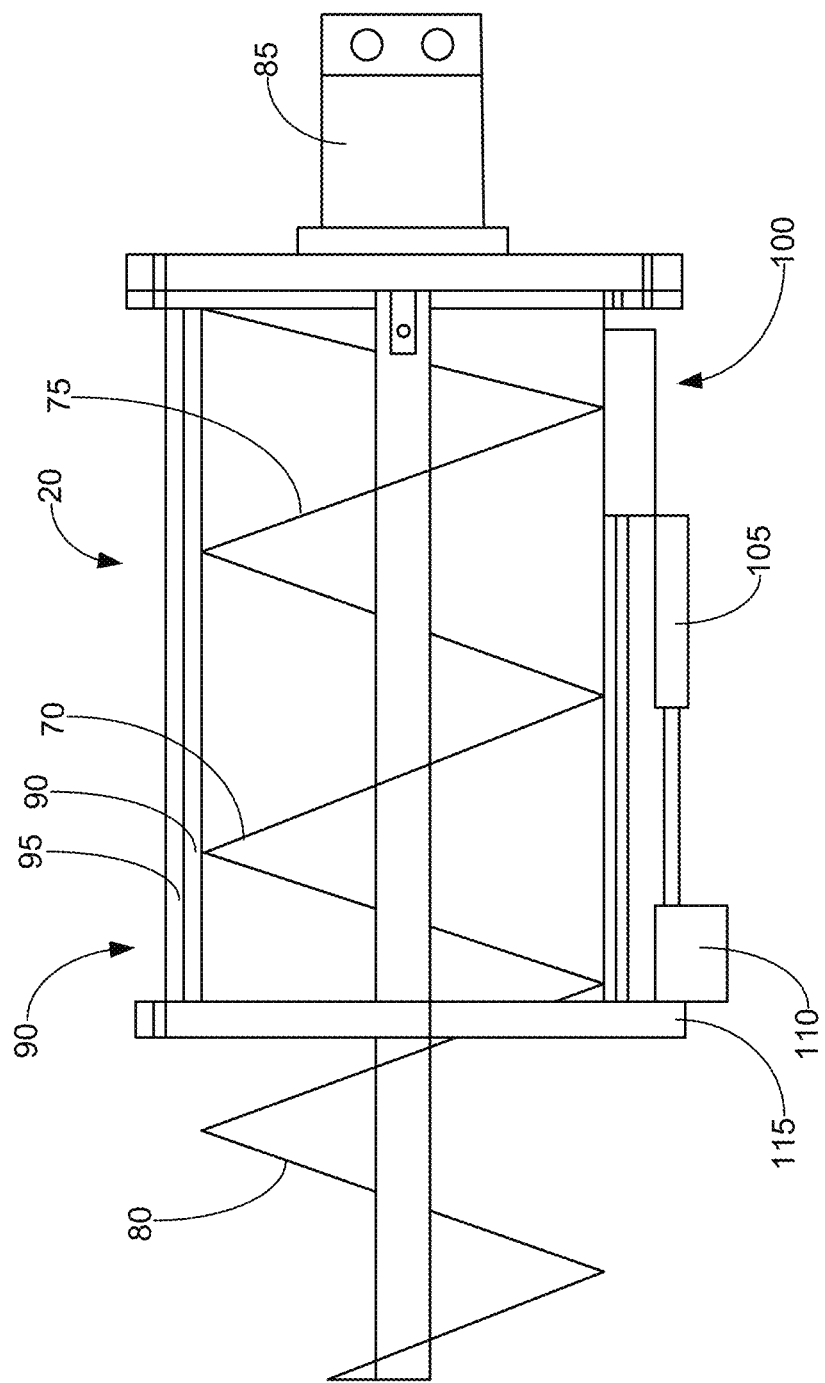
Figure 3D:
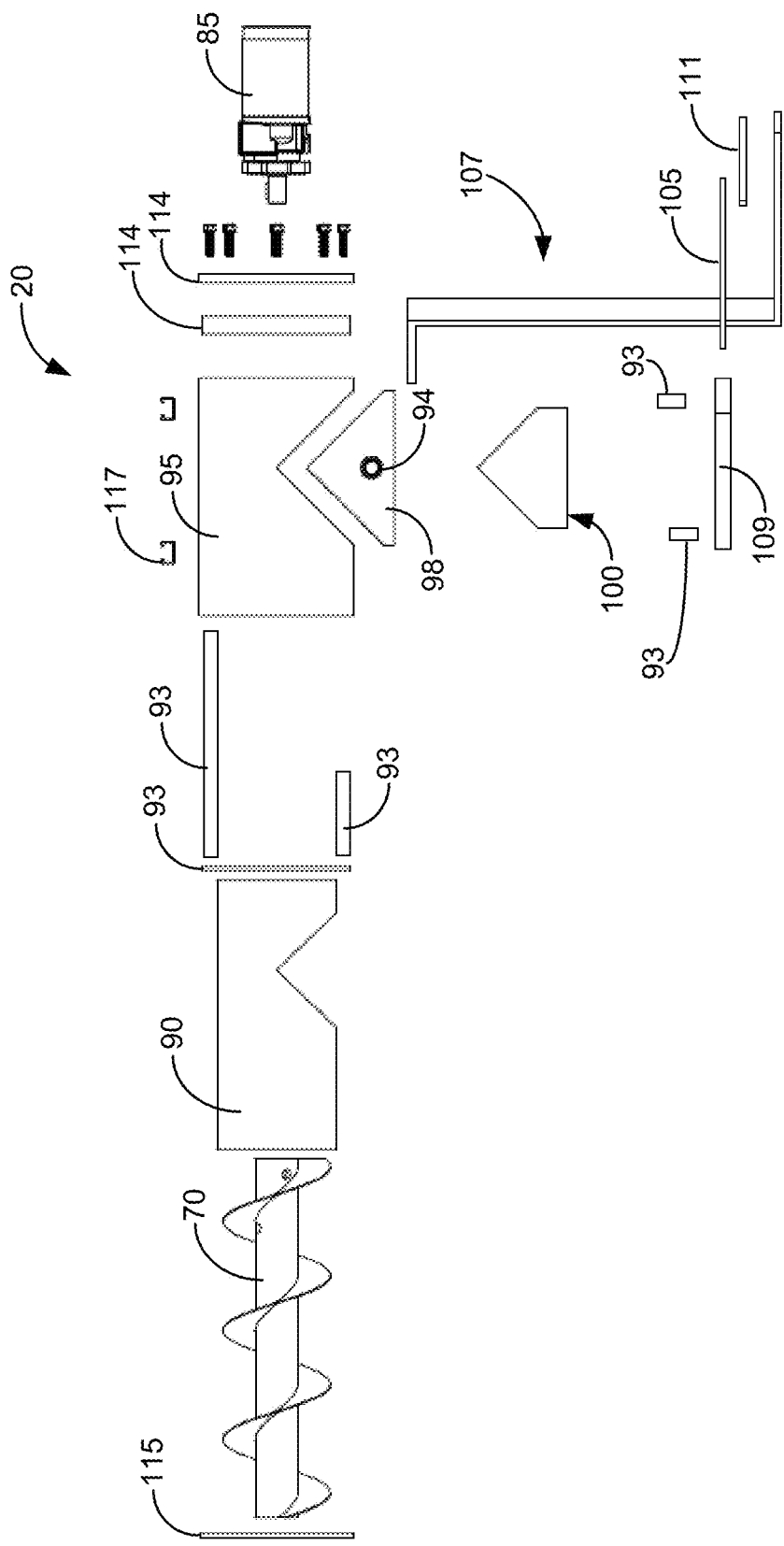
FIG. 3D-3E each illustrate an exploded view of the delivery mechanism, in accordance with a representative embodiment.
Figure 3E:
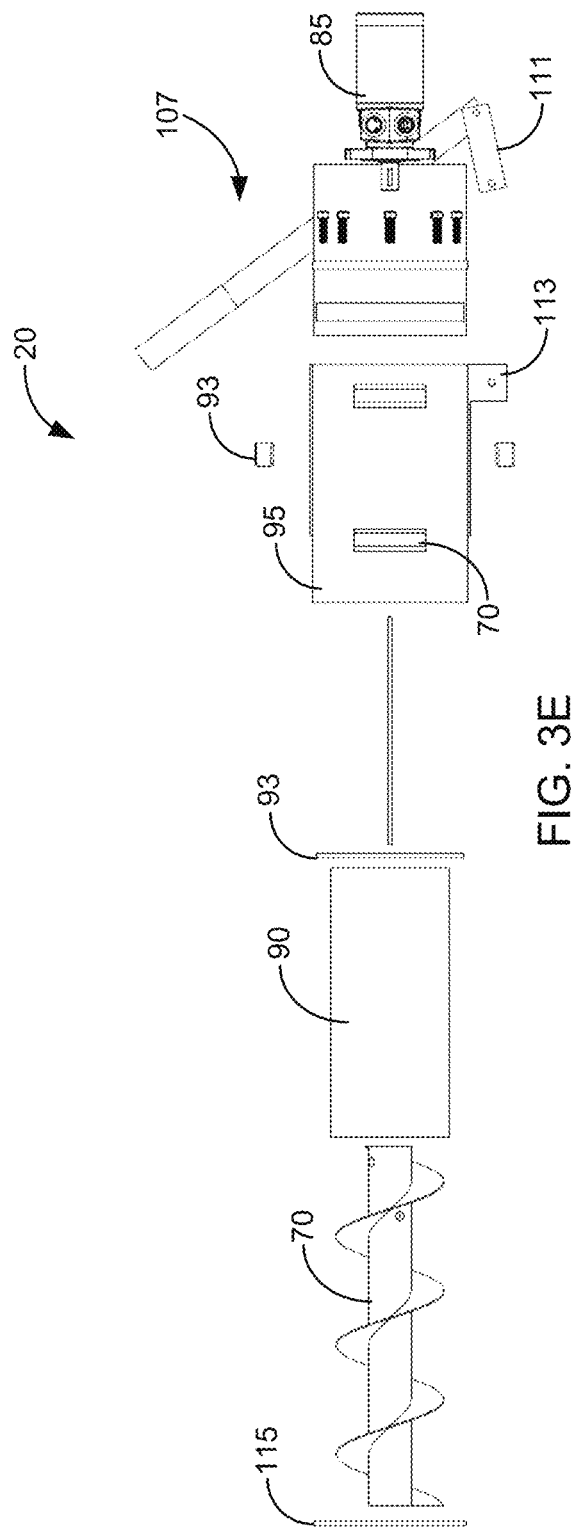
Figure 4D:
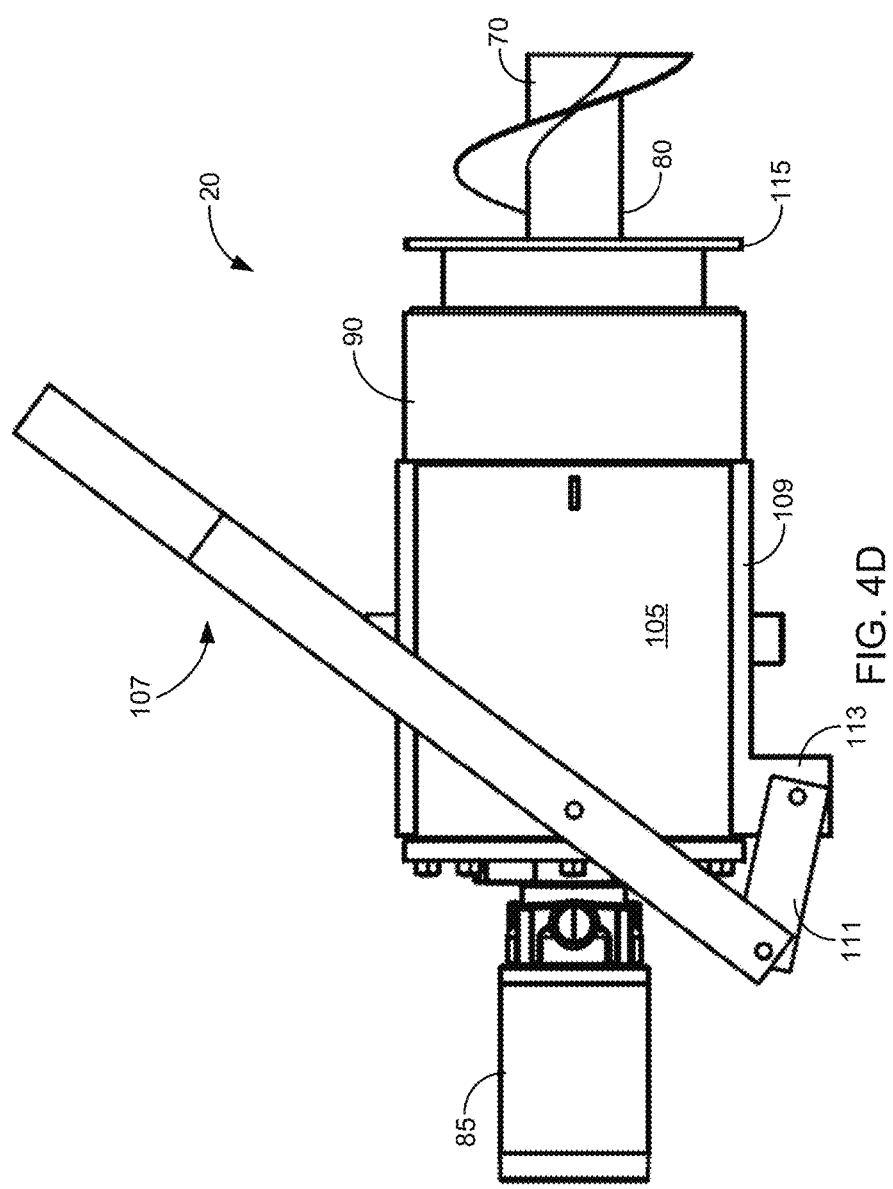
FIG. 4D illustrates a bottom view of the delivery mechanism, in accordance with a representative embodiment.
Figure 4E:
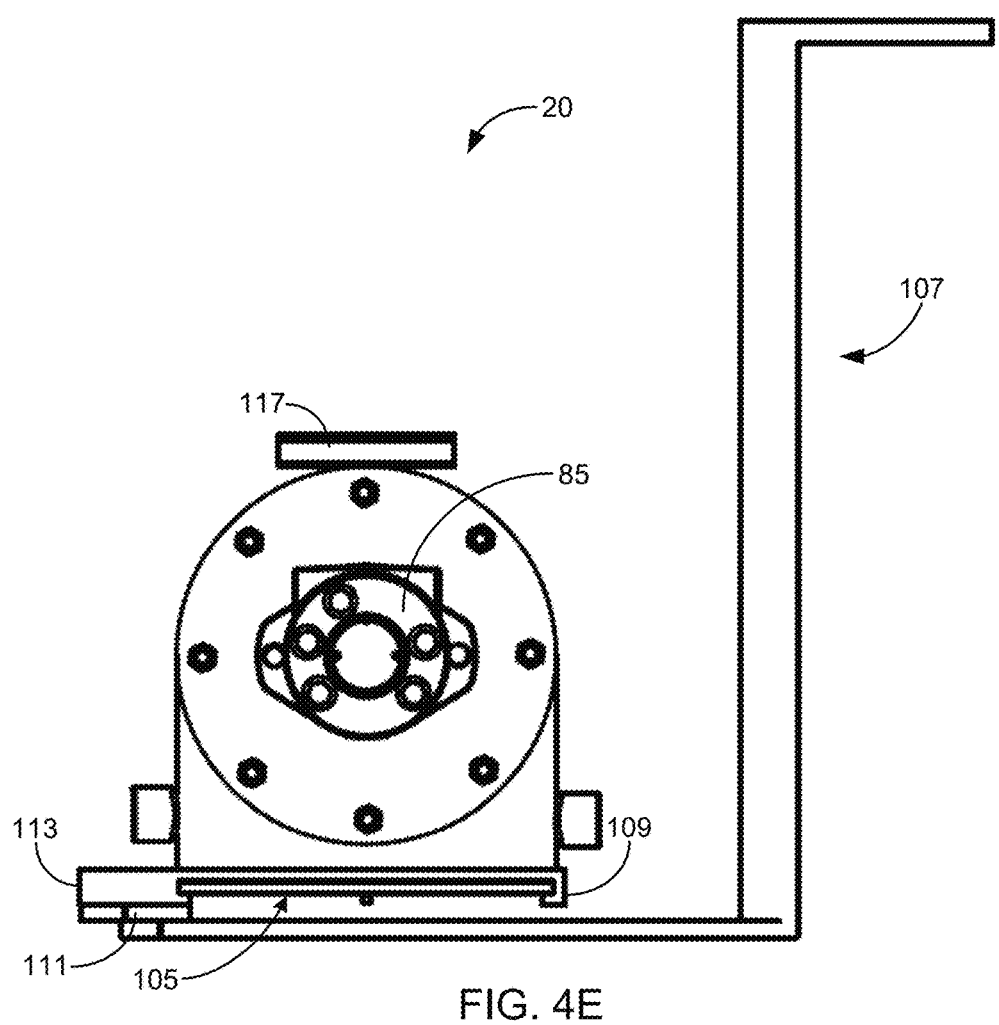
FIG. 4E illustrates an end view of the delivery mechanism, in accordance with a representative embodiment.
Figure 4F:
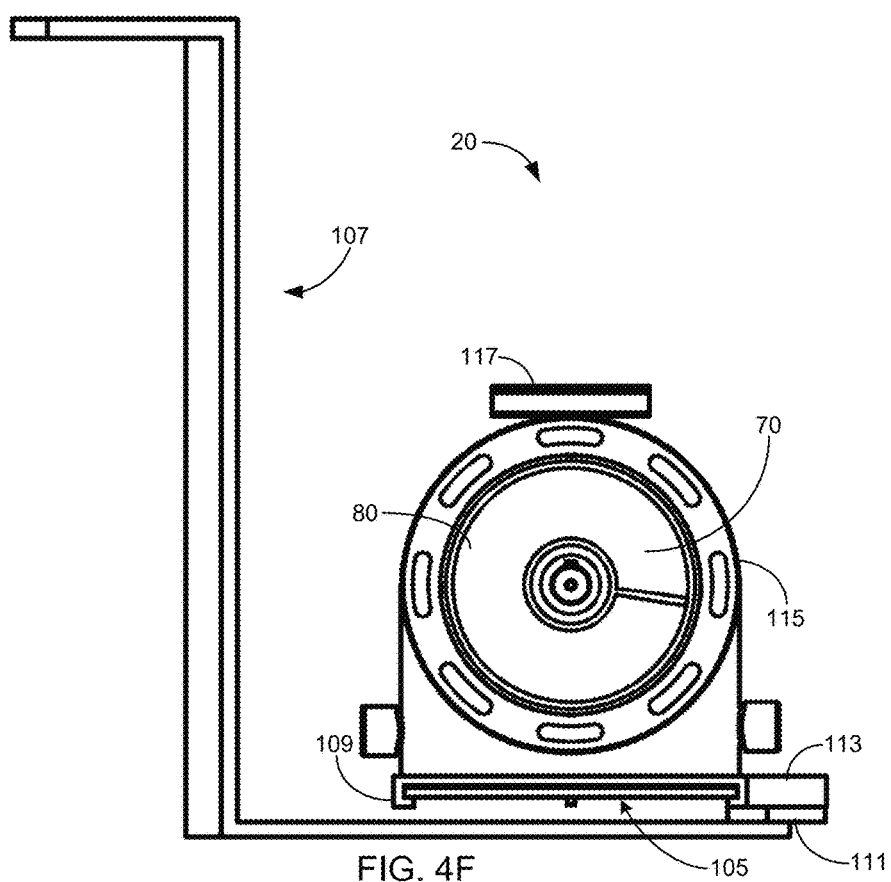
FIG. 4F illustrates an end view of the delivery mechanism, in accordance with a representative embodiment.
Figure 4G:
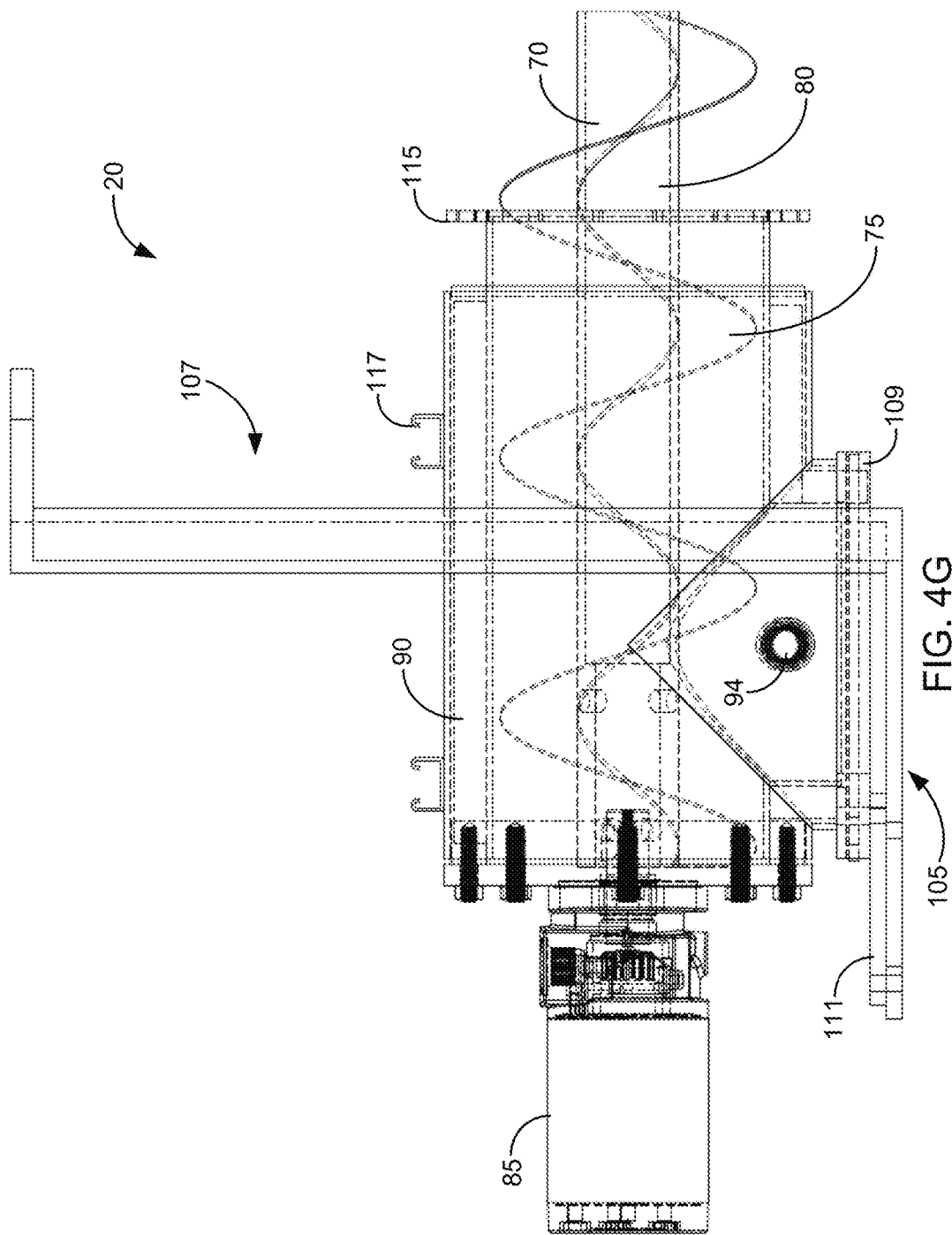
FIG. 4G illustrates a schematic view of the delivery mechanism, in accordance with a representative embodiment.
Figure 4H:
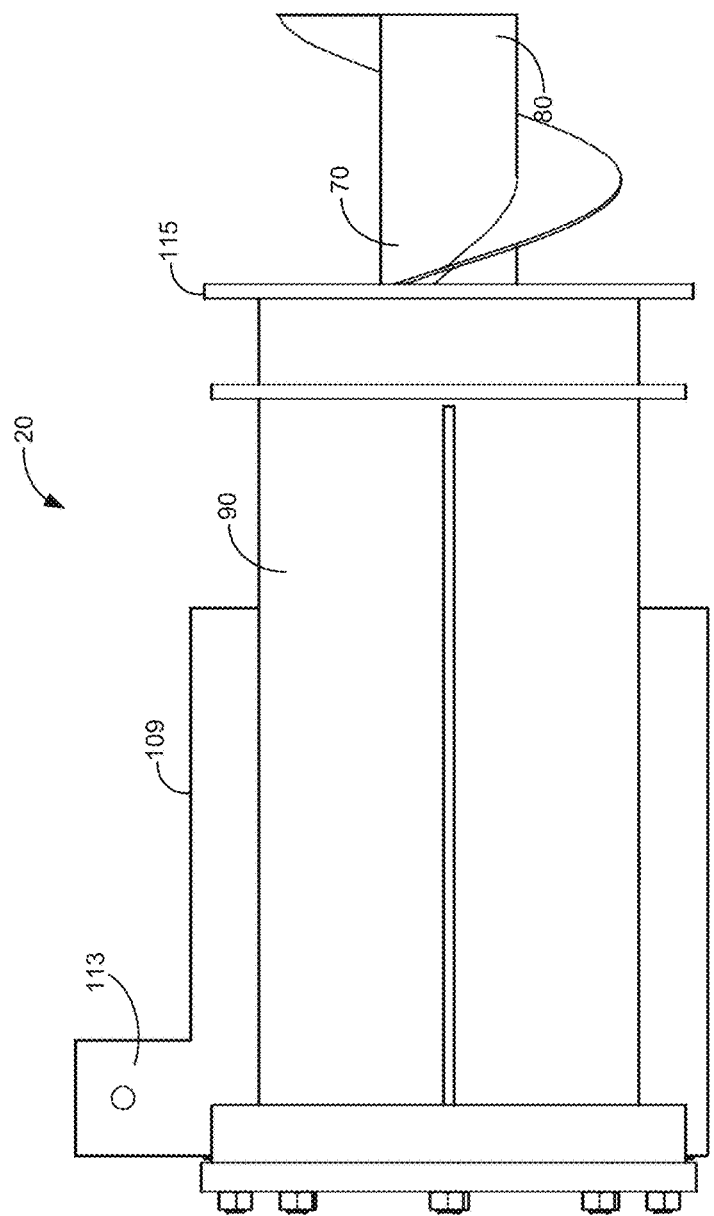
FIG. 4H illustrates a top view of the delivery mechanism, in accordance with a representative embodiment.
Figure 4I:
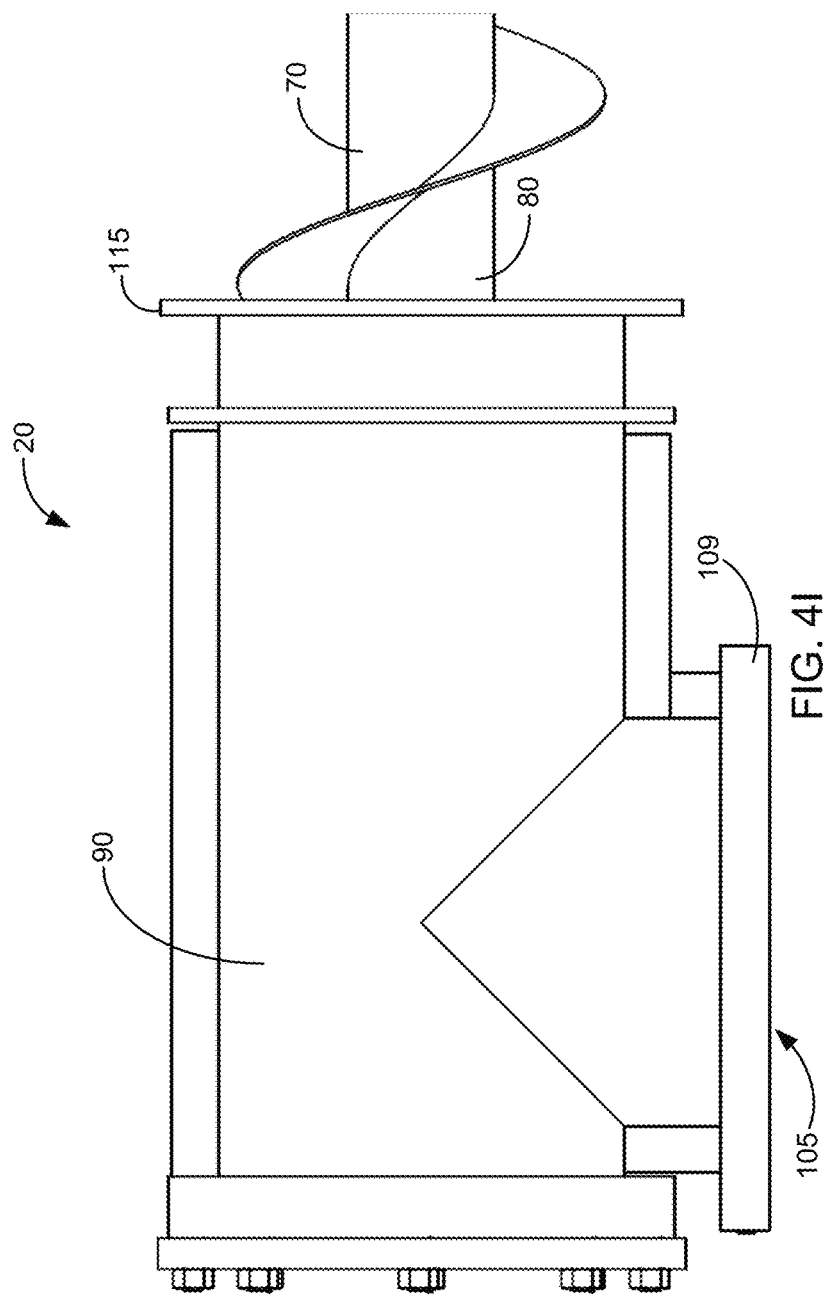
FIG. 4I illustrates a side view of the delivery mechanism, in accordance with a representative embodiment.

Although some embodiments of the cover 90 are not specifically configured to provide heat to asphalt concrete passing through the cover, in some other embodiments, the cover is configured to perform such a function. Thus, in some embodiments, asphalt concrete can remain within the cover for a relatively long period of time (e.g., during a break, during transportation, and/or any other suitable time period) without cooling and hardening more than desired (e.g., without forming a plug and/or such that the asphalt concrete maintains a desired viscosity). Additionally, in some embodiments in which asphalt concrete is allowed to solidify (at least somewhat) inside of the cover, the cover can be heated to melt, and ultimately deliver, such asphalt concrete.

Where the cover 90 is configured to be heated, the cover can be heated in any suitable manner, including, without limitation, by using: the heater from the asphalt mixer 15 (e.g., by pumping heat transfer medium 65, such as one or more oils, molten salts, and/or another suitable medium, from the mixer to a portion of the cover) and/or by using a separate mechanism that is specifically configured to heat a portion of the cover. Indeed, in some embodiments, the cover (and/or auger) is configured to be heated by one or more fires, electric heating elements, electric heaters, inductive heaters, resistive heaters, solar-powered heaters, burners, and/or other components are configured to heat the cover directly and/or to heat a heat transfer medium (e.g., one or more oils, metals, portions of the container, molten salts, waters, synthetic organic fluids, silicone fluids, glycol-based fluids, and/or any other heat transfer medium and/or media), which, in turn, is used to heat at least a portion of the cover and/or asphalt concrete in the cover. By way of non-limiting illustration, FIG. 3D illustrates some embodiments in which the auger 70 and/or cover 90 are configured to be heated by one or more heat transfer media plates, baffles, conduits, and/or other suitable heat transfer media recipients 93. Additionally, FIG. 3D shows that, in some embodiments, the delivery mechanism 20 comprises one or more heat transfer media inlets and/or outlets 94 that are configured to allow one or more heat transfer mediums to flow into and/or out of a portion of the delivery mechanism (e.g., the cover 90, the auger 70, an outer shell 98 of an downspout and/or other opening 100 in the cover, and/or any other suitable portion of the delivery mechanism).

In some embodiments in which the cover 90 is heated, the delivery mechanism 20 optionally comprises one or more insulating jackets that are configured to at least partially insulate the cover and/or to help prevent people from being burned by the cover. While such an insulating jacket can have any suitable characteristic, FIG. 3C shows an embodiment in which the jacket 95 at least partially extends around the cover 90. Additionally, while the cover can comprise any suitable type of insulating material and/or heater, in some embodiments, the cover is insulated with one or more types of fiberglass, mineral wool, cellulose, gypsum, perlite, fireboard, and/or any other suitable substance. In other embodiments, the cover comprises one or more heated jackets (e.g., jackets, pieces of tubing, baffles, and/or other recipients 93 comprising a heat transfer medium; one or more heating elements; an inductive heater; an electric heater; and/or any other suitable heating mechanism).

In some embodiments, the delivery mechanism 20 comprises one or more gates, doors, closures, and/or valves (collectively and individually the gate 105) that are configured to selectively open and/or close to allow asphalt cement to exit and/or to be prevented from exiting the cover 90 (e.g., via an opening 100 in the cover, some embodiments of which are illustrated in FIGS. 3A-4G). In this regard, the gate can comprise any suitable type of mechanism that is configured to be selectively opened and/or closed to allow asphalt cement to be delivered from and/or to be retained in the cover. Some examples of suitable gates include, but are not limited to, one or more gate valves, plates or other objects that are configured to be positioned over and to be at least partially removed from the opening in the cover, ball valves, iris valves, rotating valves, and/or any other suitable valves.

Where the delivery mechanism 20 comprises one or more gates 105, the gate can be operated in any suitable manner, including, without limitation, by being operated manually and/or via one or more motors, actuators (e.g., electrical, pneumatic, hydraulic, or otherwise), servos, and/or other suitable mechanisms. By way of non-limiting illustration, FIGS. 3B-3C show some embodiments in which the gate 105 is operated by an actuator 110.

In another non-limiting illustration showing how some embodiments of the gate 105 function, FIGS. 3D-4I show that, in some instances, the gate 105 is manually operated (e.g., via one or more handles 107). While the gate can be manually operated in any suitable manner, FIGS. 3D-4I show some embodiments in which the gate 105 is slidably coupled in a gate mount 109. Additionally, FIGS. 3D-4I show that, in some embodiments, the handle 107 is pivotally coupled to the gate 105 and a linkage 111 (which pivotally anchors to an anchor point 113) such that the handle can be moved in one direction to open the gate and in another direction to close the gate. In such embodiments, the manual gate mechanism can be modified in any suitable manner, including, without limitation, by including one or more springs, detents, and/or other mechanisms that are configured to help maintain the gate in a desired position (e.g., the closed position or otherwise).

Although, in some embodiments, the delivery mechanism 20 (e.g., the auger 70) and the gate 105 are configured to be operated completely independently, in some other embodiments, the gate and the delivery mechanism (e.g., the auger) are configured to operate with each other. In this regard, while the gate and delivery mechanism can operate together in any suitable manner, in some embodiments, the delivery mechanism (e.g., the auger) is configured to stop when (or shortly before and/or after) the gate is closed, and to move when (or shortly before and/or after) the gate is open. Indeed, in some embodiments, the delivery mechanism and the gate are both configured to operate when (or shortly after) one is actuated and/or deactivated (e.g., the gate is configured to open when the auger turns, the gate is configured to close when the auger stops turning, the auger is configured to turn when the gate opens, the auger is configured to stop turning when the gate closes, etc.).

The various portions of the delivery mechanism 20 can comprise any suitable material, including, without limitation, one or more metals (e.g., steel, iron, copper, one or more alloys, and/or any other suitable metal or metals), ceramics, synthetic materials, natural materials, low-friction materials (e.g., polytetrafluoroethylene, perfluoroalkoxy, tungsten disulfide, and/or any other suitable low-friction material), and/or other suitable materials. Indeed, in some embodiments, the cover 90 comprises steel having an internal coating comprising a low-friction material.

The various portions of the described system 10 can be made in any suitable manner. In this regard, some non-limiting examples of methods for making the described system include machining; cutting; drilling; grinding; shaping; molding; bending; lathing; extruding; forging; sanding; smoothing; buffing; polishing; polishing; connecting various pieces with one or more adhesives, mechanical fasteners (e.g., screws, clamps, rivets, staples, clips, pegs, crimps, pins, brads, threads, brackets, flanges, etc.), welds, joints, and/or by melting pieces together; and/or in any other suitable manner that allows the described system to perform its intended functions.

In addition to the aforementioned features, the described system 10 can be modified in any suitable manner that allows the system to deliver asphalt concrete from the mixer 15 to a desired location. In one example, although some embodiments of the mixer are created with the delivery system 20 attached thereto, in some other embodiments, the delivery system is configured to be retrofitted to a conventional mixer (e.g., a horizontal mixer, a mastic mixer, etc.). Where the delivery system is configured to be retrofit to an existing mixer, the delivery system can be coupled to the mixer in any suitable manner, including, without limitation, via one or more bolts, screws, pins, rivets, welds, brackets, flanges, clamps, pivot joints, actuators, servos, linkages, and/or other suitable coupling mechanisms. Indeed, in some embodiments, the delivery system 20 (e.g., the auger 70) is configured to be bolted to the mixer 15 via one or more brackets 115 and 117 (some embodiments of which are shown in FIGS. 3A-4G). Additionally, in some embodiments, the delivery mechanism is configured to be pivotally coupled to the mixer such that a portion of the delivery mechanism can pivot (e.g., via manual control, electronic control, hydraulic control, and/or otherwise) in in one or more planes to deliver the asphalt cement to a desired location without necessarily needing the location of the mixer to be moved.

In another example of a suitable modification of the described system, some embodiments of the delivery mechanism 20 are reversible, thus allowing asphalt cement that has been pulled from the container 25 (e.g., into the cover 90) to be forced back into the container. Accordingly, in some such embodiments, the delivery mechanism uses such a feature to prevent asphalt cement from forming a plug in the cover.

In another example of a suitable modification, some embodiments of the delivery mechanism comprise a control that allows a user to: turn the delivery mechanism 20 (e.g., auger 70) off, on into a forward motion, on into a reverse motion, pivot and/or otherwise move a portion of the delivery mechanism, redirect a portion of the delivery mechanism, extend and/or retract a portion of the delivery mechanism, to vary the speed of the mechanism, and/or to otherwise control the mechanism. While the described system 10 can comprise any suitable control mechanism, including, without limitation, a switch, a joystick, a hand-held computing system, a cellphone/PDA in communication with the delivery mechanism, an application for use on a computing device, and/or any other suitable control device, FIG. 5 illustrates an embodiment in which a switch or joystick 120 is used to control an auger 70, which is attached to a mixer 15 comprising an oil jacket 125 and burner 130.

In another example of a suitable modification, some embodiments to the described system 10 optionally comprise multiple delivery mechanisms 20. In such embodiments, the system can comprise any suitable combination of delivery mechanisms. Indeed, in some embodiments, the system comprises a first delivery system (which may include, without limitation, one or more augers, conveyor belts, paddle wheels, gears, peristaltic pumps, paddle chains, conveyor paddle chains, handling fans, blades, rotors, off-balanced rotors, intermeshing counter-rotating screws, slides, chutes, vibrators (e.g., electromagnetic, pneumatic, hydraulic, and/or other suitable vibrators), and/or other suitable mechanisms. Additionally, in some embodiments, a second, third, fourth, and/or other suitable number of delivery system comprises one or more of the described delivery mechanisms.

Figure 6:
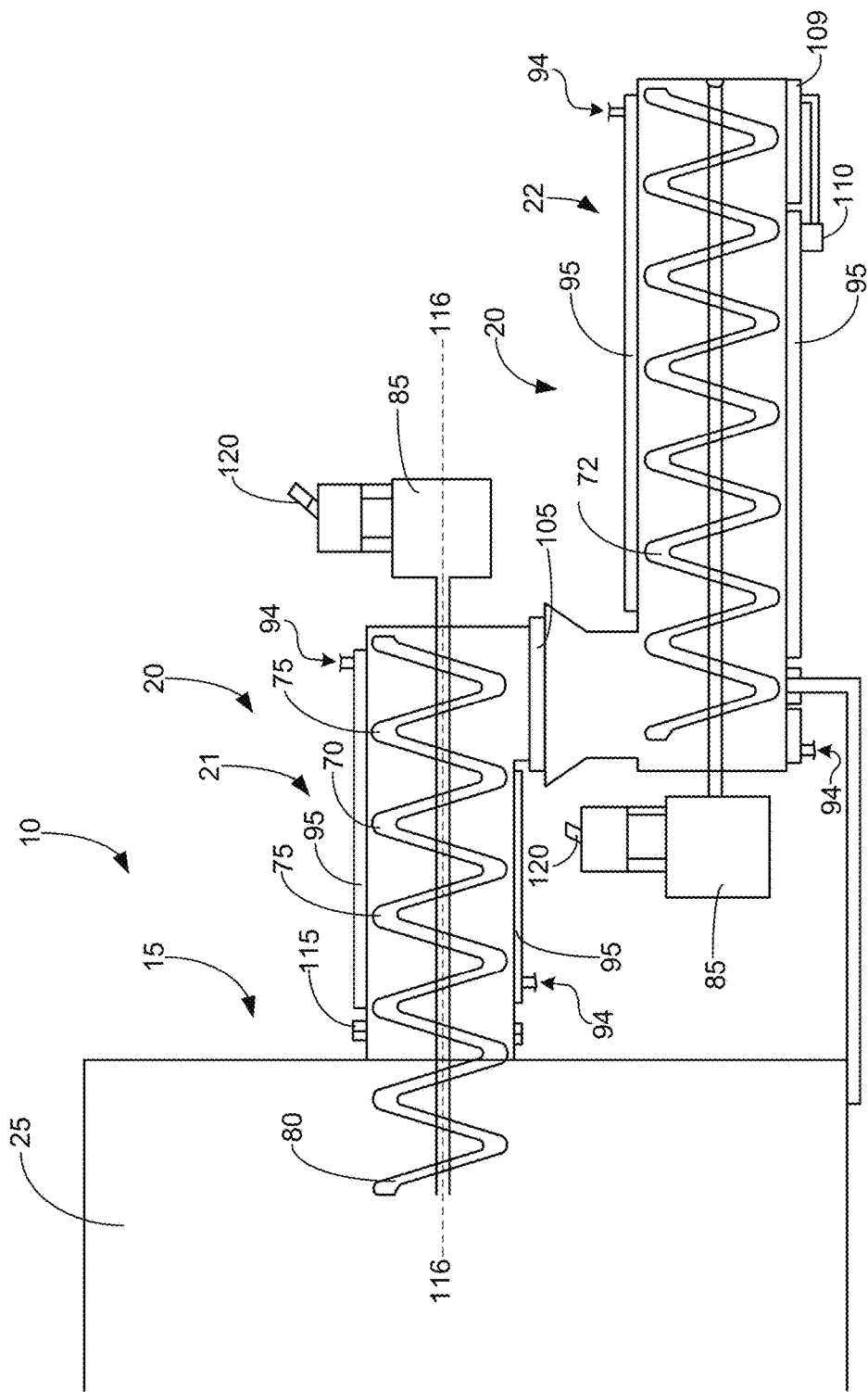
FIG. 6 illustrates a side schematic view of the delivery mechanism, in accordance with a representative embodiment.

By way of non-limiting illustration, FIG. 6 shows an embodiment in which the first delivery mechanism 21 comprises a first auger 71 and the second delivery mechanism 22 comprises a second auger 72. While the first auger can pivotally couple to the mixer 25 (e.g., so as to be able to pivot in a vertical plane and/or horizontal plane with respect to the mixer, FIG. 6 shows an embodiment in which the first auger 71 is connected with the mixer 25 via a non-pivotal connection. In contrast, even though some embodiments of the second delivery mechanism are configured to non-pivotally couple with first delivery mechanism, FIG. 6 shows an embodiment in which the second delivery mechanism 22 is configured to pivot and deliver asphalt to any suitable location within its pivot range. In such an embodiment, the first auger 71 is able to pull asphalt from the container 25, to place the asphalt in the second auger, and to deliver the asphalt to a plurality of locations without moving the container (e.g., by pivoting the second auger 72).

Where the first 21 and second 22 delivery mechanisms are pivotably coupled with each other, the second delivery mechanism can pivot in any suitable manner with respect to the first delivery mechanism, including, without, limitation, by being able to pivot in one or more planes with respect to the first delivery mechanism. Indeed, in embodiments, the second delivery mechanism is only able to move in a single place (e.g., a 360 degree circle or a segment thereof) with respect to the first delivery mechanism. In some other embodiments, however, the second delivery mechanism is coupled to the first delivery mechanism via one or more hollow ball joints, swivel ball joints, spherical joints, and/or other suitable coupling mechanisms that allow asphalt cement to flow from the first delivery mechanism to the second mechanism and that allows the second mechanism to pivot in at least two planes (e.g., in a horizontal and a vertical plane). Where the second delivery mechanism is able to pivot in a vertical plane with respect to the first delivery mechanism, the second delivery mechanism can pivot at any suitable angle with respect to a longitudinal axis of the first delivery mechanism, including, without limitation, at an angle between about 90 degrees above and below the longitudinal axis of the first delivery mechanism, and any subrange thereof (e.g., less than 45 degrees above or below the first mechanism's longitudinal axis 116).

In addition to the aforementioned features, the described system 10 can comprise any other suitable feature. Indeed, some embodiments of the described systems and methods are useful for a variety of purposes. For instance, some embodiments of the described system and/or delivery mechanism 20 are configured for dispensing asphalt concretes that have relatively low viscosities (e.g., asphalt concretes with relatively low concentrations of aggregate, such as rock, and relatively high concentrations of asphalt and/or another binder). In some other embodiments, however, the described systems and methods are well suited for delivering asphalt concretes to desired locations, even where such asphalt concretes are relatively thick or otherwise have relatively high viscosities. Indeed, in some cases, it may be beneficial to use an asphalt concrete that comprises a relatively high concentration of aggregate (e.g., between about 55% and about 95% aggregate, or any subrange thereof) and a relatively low concentration of asphalt (e.g., between about 5% and about 45%, or any subrange thereof). Additionally, in some cases, it may be beneficial to heat and use an asphalt concrete at a temperature that allows the viscosity of the asphalt concrete (e.g., the binder in the asphalt concrete) to have a relatively high viscosity. In this regard, while many conventional methods for delivering asphalt concrete may become plugged, be slow to deliver, and/or allow the asphalt concrete to undesirably cool as it is dispensed, some embodiments of the described invention are particularly well suited for delivering such asphalt concretes.

Thus, as discussed herein, the embodiments of the present invention embrace systems and methods for delivering asphalt concrete. In particular, the present invention relates to systems and methods for mixing various components of asphalt concrete in a mixer and then dispensing the asphalt concrete from the mixer. In some implementations, the described systems and methods comprise an auger that is configured to force asphalt concrete from an asphalt mixer.

The present invention may be embodied in other specific forms without departing from its spirit or essential characteristics. The described embodiments, examples, and illustrations are to be considered in all respects only as illustrative and not restrictive. The scope of the invention is, therefore, indicated by the appended claims rather than by the foregoing description. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object-regardless of whether the one object is directly on, attached, connected, or coupled to the other object, or whether there are one or more intervening objects between the one object and the other object. Also, directions (e.g., horizontal, vertical, front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. An asphalt mixer, comprising:
a heated container;
a mixing mechanism that is configured to mix asphalt and an aggregate to form asphalt concrete within the heated container;
a first drive mechanism that is configured to actuate the mixing mechanism;
an auger that is configured to force the asphalt concrete out of the heated container; and
a second drive mechanism that is configured to actuate the auger, wherein the first and second drive mechanisms are independently controllable, wherein a first portion of the auger is disposed inside of the heated container, wherein a second portion of the auger is disposed inside of a cover that extends out from the heated container, the mixer further comprising: a first heating mechanism that is coupled to the heated container and a second heating mechanism that is coupled to the cover.

2. The mixer of claim 1, wherein the mixing mechanism comprises at least one of an agitator, a paddle, a hook, a beater, a kneader, a tine, a roller, and a rotating drum.

3. The mixer of claim 1, wherein the first heating mechanism comprises a first electric heating mechanism and wherein the second heating mechanism comprises a second electric heating mechanism.

4. The mixer of claim 1, wherein the mixing mechanism comprises an agitator.

5. The mixer of claim 4, wherein the cover comprises an opening and a single gate that covers the opening, wherein the gate is configured to selectively open and close to respectively allow the asphalt concrete to exit from and to prevent the asphalt concrete from exiting the opening, and wherein the auger is configured to automatically stop rotating when the single gate is closed.

6. The mixer of claim 1, wherein the auger has been retrofitted to the asphalt mixer.

7. An asphalt mixer, comprising:
a heated container configured to heat contents of the container;
a mixing mechanism that is configured to mix asphalt and an aggregate to form asphalt concrete within the heated container;
a first drive mechanism that is configured to actuate the mixing mechanism;
a first auger that is configured to force the asphalt concrete out of the heated container; and a second drive mechanism that is configured to actuate the first auger, the first and second drive mechanisms being independently controllable, wherein a first portion of the first auger is disposed outside of the heated container, wherein a second portion of the first auger is disposed inside of the heated container, wherein the first portion of the first auger is disposed inside of a cover, and wherein the cover is heated to selectively prevent the asphalt concrete from hardening, the mixer further comprising: a first heating mechanism that is coupled to and provides heat to the heated container; and a second heating mechanism that is coupled to and provides heat to the cover; and an insulation layer that surrounds a portion of the cover.

8. The mixer of claim 7, further comprising a second auger that is configured to receive asphalt concrete from the first auger and to pivot with respect to the first auger.

9. The mixer of claim 8, wherein the second auger is configured to pivot in both a first and a second plane with respect to the first auger.

10. The mixer of claim 7, further comprising a gate that is configured to automatically open when the first auger turns and to automatically close when the first auger stops turning.

11. The mixer of claim 7, wherein the cover comprises a manually operated gate that is coupled to a handle that is pivotally coupled to the gate such that the handle is movable in a first direction to open the gate and a second direction to close the gate.

12. An asphalt mixer, comprising:

a heated container;

a first heating mechanism that is coupled to the heated container and that is configured to heat contents of the heated container;

a mixing mechanism that is at least partially disposed in the heated container and that is configured to mix asphalt and an aggregate to form asphalt concrete within the heated container;

a first drive mechanism that actuates the mixing mechanism;

a first auger that is configured to force the asphalt concrete out of the heated container, a first portion of the first auger disposed outside of the heated container and a second portion of the first auger extending into the heated container;

a second drive mechanism that actuates the first auger, the first and second drive mechanisms being independently controllable;

a cover that extends from the heated container, wherein the first portion of the first auger is disposed inside of the cover; and a second heating mechanism that is coupled to the cover.

13. The mixer of claim 12, wherein the mixing mechanism comprises a twisting mixing element that is rotatably disposed in the heated container at an inclined angle.

14. The mixer of claim 12, wherein the mixing mechanism comprises an agitator.

* * * * *